(12) United States Patent
Jain et al.

(10) Patent No.: US 12,368,950 B2
(45) Date of Patent: Jul. 22, 2025

(54) METHOD AND SYSTEM OPERATING AN IMAGING SYSTEM IN AN IMAGE CAPTURING DEVICE BASED ON ARTIFICIAL INTELLIGENCE TECHNIQUES

(71) Applicant: SAMSUNG ELECTRONICS CO., LTD., Suwon-si (KR)

(72) Inventors: Abhishek Jain, Noida (IN); Nibha Sharma, Noida (IN); Manu Tiwari, Noida (IN); Shobhit Verma, Noida (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 163 days.

(21) Appl. No.: 18/106,214

(22) Filed: Feb. 6, 2023

(65) Prior Publication Data

US 2023/0199301 A1 Jun. 22, 2023

Related U.S. Application Data

(63) Continuation of application No. PCT/KR2021/013999, filed on Oct. 12, 2021.

(30) Foreign Application Priority Data

Oct. 30, 2020 (IN) .............................. 202011047461

(51) Int. Cl.
*H04N 23/63* (2023.01)
*G06T 5/20* (2006.01)
(Continued)

(52) U.S. Cl.
CPC .............. *H04N 23/64* (2023.01); *G06T 5/20* (2013.01); *G06T 5/70* (2024.01); *H04N 23/632* (2023.01);
(Continued)

(58) Field of Classification Search
CPC .... H04N 23/64; H04N 23/632; H04N 23/811; H04N 23/617; G06T 5/20; G06T 5/70;
(Continued)

(56) References Cited

U.S. PATENT DOCUMENTS 6,940,550 B2    9/2005 Kitawaki et al.
8,208,043 B2    6/2012 Deng et al.
(Continued)

FOREIGN PATENT DOCUMENTS

JP          6492960 B2      4/2019
KR    1020090104027 A    10/2009
(Continued)

OTHER PUBLICATIONS

Lens Adhering Contaminant Detection Using Spatio-Temporal Blur Vivek Akkala, Parth Parikh, Mahesh BS, Ajinkya S. Deshmukh, Swarup Medasani Image Understanding Group, Uurmi Systems (Year: 2016).*
(Continued)

*Primary Examiner* — Twyler L Haskins
*Assistant Examiner* — Surafel Yilmakassaye
(74) *Attorney, Agent, or Firm* — Sughrue Mion, PLLC

(57) ABSTRACT

A method for image capture using artificial intelligence (AI) techniques to generate a user-personalized and noise-corrected final image from a captured image, that includes classifying a noise associated with a lens of an imaging device, preprocessing the captured image based on the classified noise to determine an initial region of interest (ROI), generating a first processed image by inputting the initial ROI and the captured image to a deep learning network, receiving a passive user input corresponding to a portion of a first preview of the first processed image, determining an additional ROI based on the passive user input and the classified noise, generating a second processed
(Continued)

image by inputting the second ROI and the captured image to the deep learning network, and generating a user-personalization based noise-corrected final image based on the second processed image.

23 Claims, 32 Drawing Sheets

(51) Int. Cl.
  *G06T 5/70* (2024.01)
  *H04N 23/60* (2023.01)
  *H04N 23/81* (2023.01)
(52) U.S. Cl.
  CPC .. *H04N 23/811* (2023.01); *G06T 2207/20036* (2013.01); *G06T 2207/20084* (2013.01)
(58) Field of Classification Search
  CPC . G06T 2207/20036; G06T 2207/20084; G06T 5/60; G06T 2200/24; G06T 2207/20081; G06T 2207/20104; G06N 3/006; G06N 3/045; G06N 3/088; G06V 10/248; G06V 10/25; G06V 10/30; G06V 10/82
  See application file for complete search history.

(56) References Cited

U.S. PATENT DOCUMENTS

| | | | |
|---|---|---|---|
| 8,457,439 | B2 | 6/2013 | Gu et al. |
| 8,600,184 | B2 | 12/2013 | Guo et al. |
| 8,743,208 | B2 | 6/2014 | Ovsiannikov |
| 9,749,523 | B2 | 8/2017 | Kano |
| 10,521,890 | B2 | 12/2019 | Guerreiro |
| 10,810,709 | B1 | 10/2020 | Tiyyagura et al. |
| 10,855,933 | B2 | 12/2020 | Ahn et al. |
| 11,379,955 | B2 | 7/2022 | Nair et al. |
| 2005/0231603 | A1 | 10/2005 | Poon |
| 2008/0240607 | A1 | 10/2008 | Sun et al. |
| 2009/0034872 | A1* | 2/2009 | Chiang ............ H04N 23/76 382/274 |
| 2010/0046804 | A1 | 2/2010 | Gu et al. |
| 2010/0119173 | A1 | 5/2010 | Guo et al. |
| 2012/0218453 | A1* | 8/2012 | Hosokawa .......... H04N 5/772 348/E5.024 |
| 2015/0030237 | A1* | 1/2015 | Jancsary ............ G06T 5/60 382/159 |
| 2016/0344945 | A1 | 11/2016 | Kano |
| 2018/0096474 | A1 | 4/2018 | Guerreiro et al. |
| 2018/0319376 | A1* | 11/2018 | Dusina ............. G02B 27/0006 |
| 2019/0238759 | A1 | 8/2019 | Ahn et al. |
| 2020/0150055 | A1 | 5/2020 | Quan et al. |
| 2020/0334486 | A1 | 10/2020 | Joseph et al. |
| 2020/0388011 | A1 | 12/2020 | Nair et al. |
| 2023/0262322 | A1* | 8/2023 | Hou .................. G06V 10/761 348/222.1 |

FOREIGN PATENT DOCUMENTS

| | | |
|---|---|---|
| KR | 1020190092995 A | 8/2019 |
| KR | 1020190099914 A | 8/2019 |
| KR | 1020200099633 A | 8/2020 |

OTHER PUBLICATIONS

Lens Adhering Contaminant Detection Using Spatio-Temporal Blur; Vivek Akkala (Year: 2016).*

Wilson, M., "Best camera for photography 2022: top picks for every style and budget", The Source for Tech Buying Advice, (2022), 67 pages. https://www.techradar.com/news/best-camera.

Redefining mobile photography, Al Camera, 17 pages. https://www.samsung.com/semiconductor/minisite/exynos/technology/aicamera/.

Thomson Reuters, "iphone 11 Pro, iPhone 11 Pro Max Shift Smartphone Camera Battleground to AI", Gadgets 360, Sep. 12, 2019, 4 pages. https://gadgets.ndtv.com/mobiles/news/iphone-11-pro-max-camera-aiphotography-triple-lenses-2099894/.

Communication issued Jun. 6, 2022 by the Indian Patent Office in Indian Patent Application No. 202011047461.

Written Opinion issued Feb. 3, 2022 by the International Searching Authority in International Application No. PCT/KR2021/013999.

International Search Report issued Feb. 3, 2022 by the International Searching Authority in International Application No. PCT/KR2021/013999.

* cited by examiner

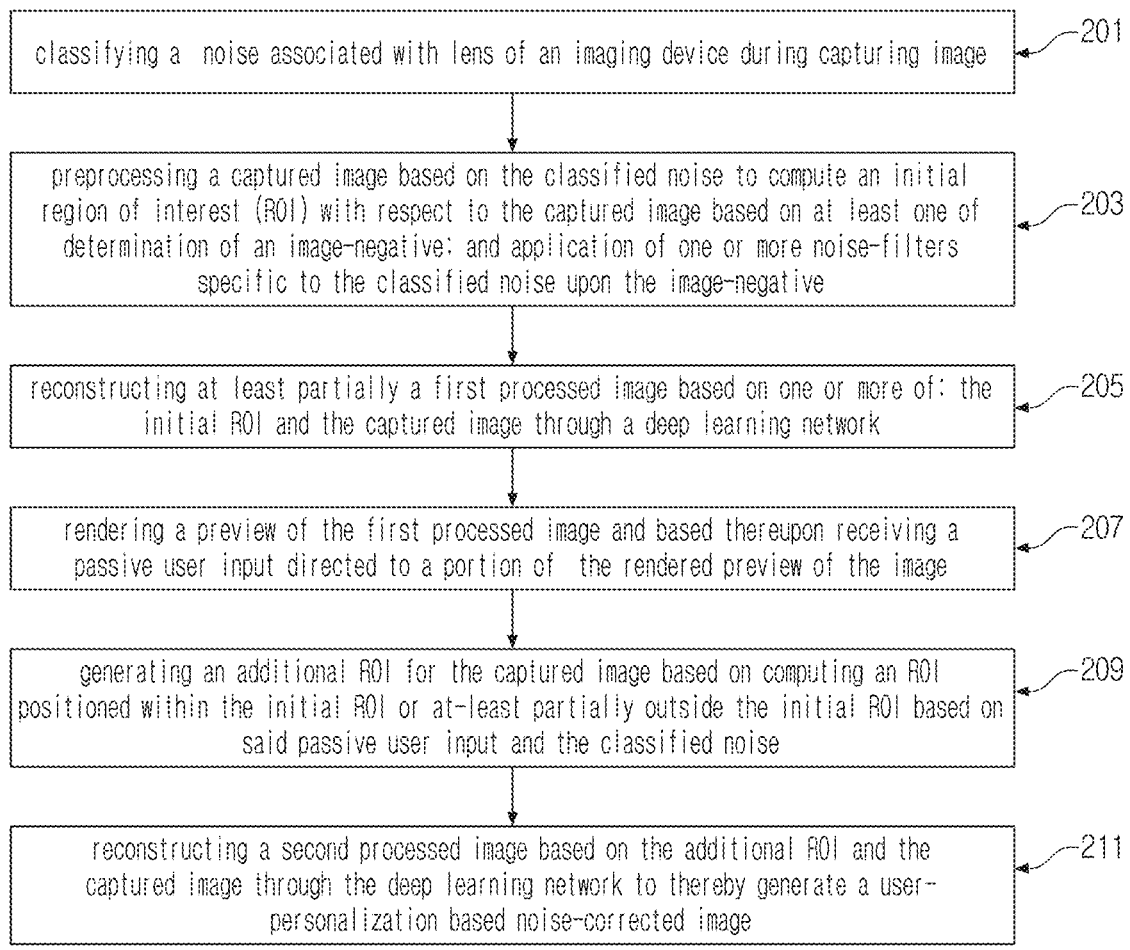

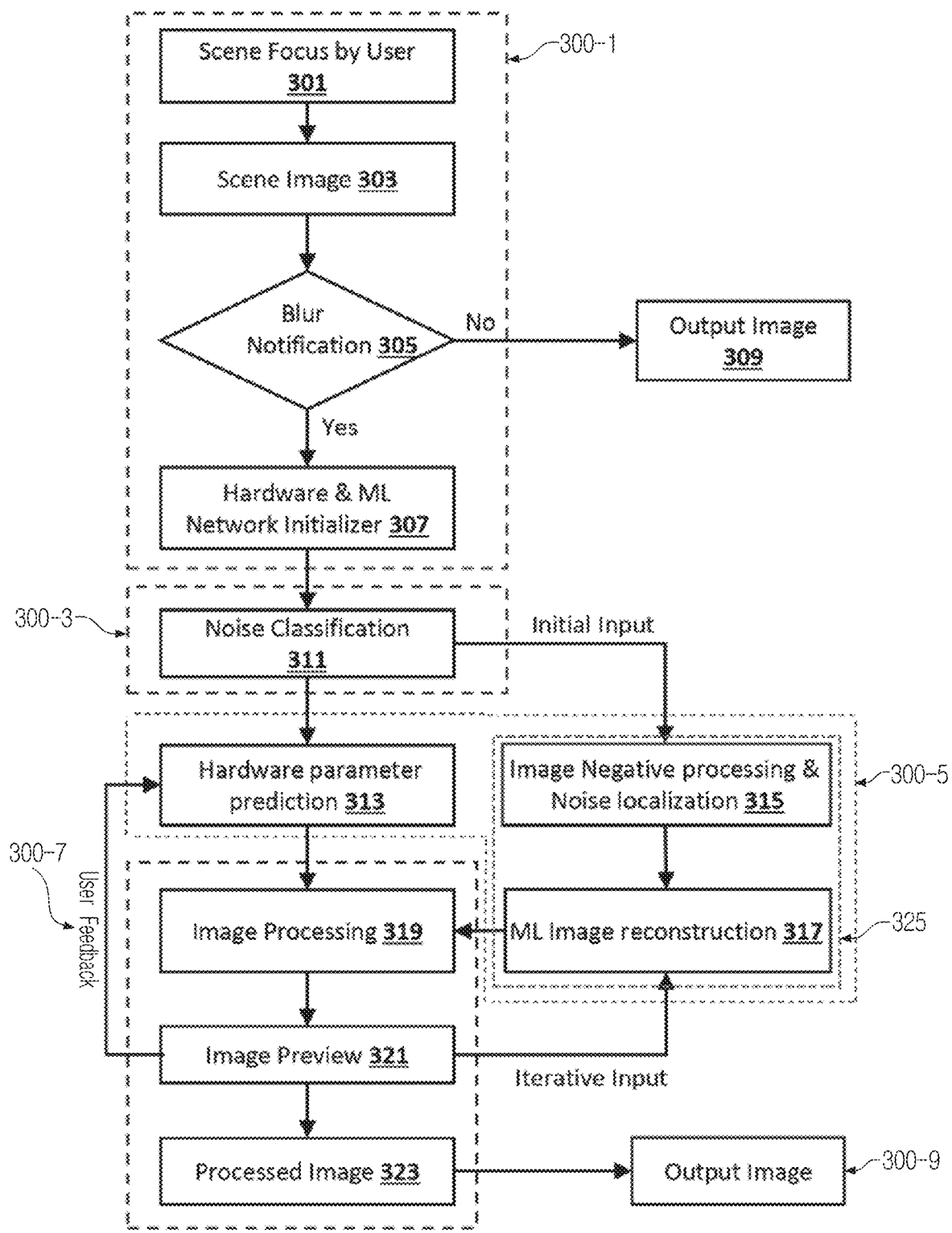

Image Negative obtain sharper edges for contaminated darker images.

Output of optimal canny edge detection using the computed mean.

Map prediction for each hardware parameter

Active User feedback (f/b) :

Stopping Criteria

METHOD AND SYSTEM OPERATING AN IMAGING SYSTEM IN AN IMAGE CAPTURING DEVICE BASED ON ARTIFICIAL INTELLIGENCE TECHNIQUES

CROSS REFERENCE TO RELATED APPLICATION(S)

This application is a bypass continuation of PCT International Application No. PCT/KR2021/013999, which was filed on Oct. 12, 2021, and claims priority to Indian Patent Application No. 202011047461, filed on Oct. 30, 2020, in the Indian Patent Office, the disclosures of which are incorporated herein by reference in their entireties.

BACKGROUND

1. Field

The disclosure relates to systems and methods for capturing an image using artificial intelligence (AI) techniques, and more specifically providing real-time image correction in an imaging system based on user feedback.

2. Description of Related Art

In the recent years imaging devices like camera has become popular with the advancement of imaging techniques. However, the imaging devices used in real-time are constrained due to lens contamination caused by physical parameters of environment. Usually, thin/thick occlusion over camera lens occur due to various noises such as fog, dust, droplet, mud, dirt, etc. These noises contaminate the lens and add significant unwanted artifacts in a captured image.

According to an existing solution, as shown in FIG. 1A, when a user focuses on the scene as shown in block 101, the optical properties changes due to contamination present on the lens. Such contamination may be termed as lens contamination. In lens contamination unwanted artifacts appear in the captured image as shown in FIG. 1B. Due to the presence of contaminant over lens, incoming light gets either absorbed by dirt or light enters towards sensor gets scattered by the dirt on lens which causes defocused or blurring effect in the captured image. Absorption makes the affected region darker while scattering makes the region brighter. Further, a contamination in a captured image may also occur due to contaminant present in environment like fog/mist/haze termed as a scene contamination as shown in FIG. 1C. In the scene contamination, the contaminant pattern around the object is same. Both mist and fog behave as a natural soft-box, scattering light sources and altering definition, contrast, and color saturation of the captured image. In the presence of contamination particles light deflect from its original path of propagation, so the incoming light to the lens and in turn to the sensor itself is low. Thus, a blurred scene 103 is being generated. Further, the state-of-the-art techniques allow intelligent scene understanding and smoothing as shown in block 105 to generate a corrected image 107. However, the intelligent scene understanding leads to low performance, as single value of exposure does not fit for every kind of scene. Further, in some scenarios, the user has to refocus on a blurry scene manually for getting an optimized image.

Additionally, state-of-the-art techniques are not capable of correcting the noise based on its type. In particular, the state-of-the-art techniques usually handle different type of noises by applying similar techniques to correct all the type of noises, thereby mishandling in the noise correction. Furthermore, the state-of-the-art techniques unable to differentiate scene and lens contamination which again leads to improper noise correction in the captured image. Therefore, the generated output image misses details and not able to capture clear and crisp scene details in presence of such contamination. Furthermore, the mishandling of noise correction also leads to low-light photo quality and pixelated photos when zoomed on the captured image. Furthermore, intelligent solution like utilization of Deep Neural Network (DNN) techniques may slow down performance of the system due to their dependency on server. Thus, the state-of-the-art techniques are not able to efficiently appropriate device image processing to enhance the image.

Further, there lies a need for a mechanism to generate a corrected image that can efficiently overcome the aforementioned issues.

SUMMARY

According to an aspect of the disclosure, a method for image capture includes: classifying a noise associated with a lens of an imaging device during image capture; preprocessing a captured image based on the classified noise to determine an initial region of interest (ROI) with respect to the captured image based on a negative-image of the captured image and at least one noise filter applied to the negative-image, the at least one noise filter corresponding to the classified noise; generating a first processed image by inputting the initial ROI and the captured image to a deep learning network, the first processed image corresponding to a first reconstruction of the captured image; rendering a first preview corresponding to the first processed image; receiving a passive user input corresponding to a portion of the first preview; determining a second ROI with respect to the captured image based on the passive user input and the classified noise, the second ROI positioned at least partially within the initial ROI; generating a second processed image by inputting the second ROI and the captured image to the deep learning network, the second processed image corresponding to a second reconstruction of the captured image; and generating a user-personalization based noise-corrected final image based on the second processed image.

The classifying the noise associated with the lens of the imaging device may include: capturing a live-view image as the captured image; calculating at least one metric based on the live-view image; receiving a notification that indicates a visual artifact in the live-view image based on the calculated metric; determining if a lens of the imaging device is externally contaminated based on the notification; and classifying the external lens contamination as one or more type of noise through a convolution neural network (CNN) based noise classifier.

The preprocessing of the captured image may include: computing the negative-image based on a color space to highlight a noise affected region in the captured image; applying one or more noise localization mechanism to the negative-image based on selection of the one or more noise-filters in turn based on the classified noise; and determining the initial ROI for the captured images based on the application of the applied noise localization mechanisms.

The at least one noise filter applied to the negative-image may include at least one of: a fog filter including a linear transformation criteria based at least in part on a brightness, contrast and luminance associated with the negative-image; and a water or dust filter including an edge detection criteria based on one or more medians of the negative-image, a morphological closing process including a plurality of shape expansion operations and shape reduction operations, and outlier-removal.

The preprocessing the captured image may include: extracting, via a plurality of a hardware parameter prediction blocks, at least one vector for the captured image based on the classified noise, the at least one vector including at least one of a significant component vector and a hardware parameter vector, and the hardware parameter prediction blocks corresponding to pre-trained networks configured to correct an image affected by at least one of dust, fog, and water droplets; and predicting, via the plurality of hardware parameter prediction blocks, a first plurality of commensurate hardware parameters based on the at least one vector.

The rendering the first preview may include: processing the first processed image based on the predicted first plurality of commensurate hardware parameters.

The determining the second ROI with respect to the captured image may include determining location coordinates with respect to the first processed image, based on the portion of the first preview corresponding to the passive user input, by sensing at least one of: a contact with a region of a display on which the first preview is displayed, the contacted region of the display being proximate to the portion of the first preview, a gesture corresponding to the portion of the first preview, and an utterance corresponding to the portion of the first preview.

The method may further include, based on ascertaining that the location coordinates correspond to a location inside the initial ROI, applying a shape-reduction based operation against the location coordinates to determine the second ROI with respect to the captured image, the second ROI corresponding to a smaller area than the initial ROI.

The method may further include, based on ascertaining that the location coordinates correspond to a location outside the initial ROI, applying a shape-expansion based operation in accordance with the classified noise against the location coordinates to determine the second ROI with respect to the captured image.

The method may further include modifying the at least one vector based on location coordinates of the portion of the first preview; predicting, via the plurality of hardware parameter prediction blocks, a second plurality of commensurate hardware parameters based on the modified at least one vector; and rendering a second preview corresponding to the second processed image based on the predicted second plurality of commensurate hardware parameters.

The rendering the second preview may include: applying the predicted second plurality of commensurate hardware parameters to the second processed image; and generating the final image, based on the processed second processed image.

The passive user input corresponding to the portion of the first preview may include at least one of a touch for focus setting and eye gaze information used to determine the second ROI with respect to the captured image.

The pre-processing of the captured image and the generating of the first processed image may correspond to a predetermined criteria.

The pre-processing of the captured image and the generating of the first processed image may correspond to a dynamically determined criteria, the dynamically determined criteria including a real-time determination of at least one of a type of a noise-filter for localizing the classified noise, a type of deep learning network, and a type of a hardware parameter applied to the first processed image.

According to an aspect of the disclosure, an image-capturing device includes: a noise-classifier module configured to classify a noise associated with a lens of an imaging device during image capture; a first image processing module configured to preprocess a captured image based on the classified noise to determine an initial region of interest (ROI) with respect to the captured image based on a negative-image of the captured image and at least one noise filter applied to the negative-image, the at least one noise filter corresponding to the classified noise; a first image reconstruction module configured to at least partially reconstruct the captured image by generating a first processed image based on inputting the initial ROI and the captured image to a deep learning network; a rendering module configured to render a first preview corresponding to the first processed image; a user feedback module configured to receive a passive user input corresponding to a portion of the first preview; a second image processing module configured to determine a second ROI with respect to the captured image based on the passive user input and the classified noise, the second ROI positioned at least partially within the initial ROI; a second image reconstruction module configured to reconstruct the captured image by generating a second processed image based on inputting the second ROI and the captured image to the deep learning network; and an output generating module configured to generate a user-personalized and noise-corrected final image.

The image-capturing device may further include a hardware correction module configured to: extract at least one vector for the captured image based on the classified noise, the at least one vector includes at least one of a significant component vector and a hardware parameter vector; and predict a first plurality of commensurate hardware parameters based on the at least one vector.

The hardware correction module may be further configured to: modify the at least one vector based on location coordinates of the portion of the first preview; and predict a second plurality of commensurate hardware parameters based on the modified at least one vector.

The rendering module may be further configured to: apply the predicted second plurality of commensurate hardware parameters to the second processed image to render a second preview corresponding to the second processed image; and generate the final image based on the processed second processed image.

The first image processing module may be configured to apply the at least one noise filter to the negative-image based on a dynamically determined criteria including a real-time determination of at least one of a type of a noise-filter for localizing the classified noise, a type of deep learning network, and a type of a hardware parameter applied to the first processed image.

According to an aspect of the disclosure, a non-transitory computer readable medium may store computer readable program code or instructions which are executable by a processor to perform a method for image capture. The method includes: classifying a noise associated with a lens of an imaging device during image capture; preprocessing a captured image based on the classified noise to determine an initial region of interest (ROI) with respect to the captured image based on a negative-image of the captured image and at least one noise filter applied to the negative-image, the at least one noise filter based on the classified noise; generating a first processed image by inputting the initial ROI and the captured image to a deep learning network, the first processed image corresponding to a first reconstruction of the captured image; rendering a first preview corresponding to the first processed image; receiving a passive user input corresponding to a portion of the first preview; determining a second ROI with respect to the captured image based on the passive user input and the classified noise, the second ROI positioned at least partially within the initial ROI; generating a second processed image by inputting the second ROI and the captured image to the deep learning network, the second processed image corresponding to a second reconstruction of the captured image; and generating a user-personalization based noise-corrected final image based on the second processed image.

BRIEF DESCRIPTION OF DRAWINGS

These and other features, aspects, and advantages of the present disclosure will become better understood when the following detailed description is read with reference to the accompanying drawings in which like characters represent like parts throughout the drawings, wherein:

FIG. 2 illustrates a method, according to an embodiment;

FIG. 3 illustrates an implementation of the method-steps of FIG. 2, in accordance with an embodiment;

DETAILED DESCRIPTION

Figure 1A:
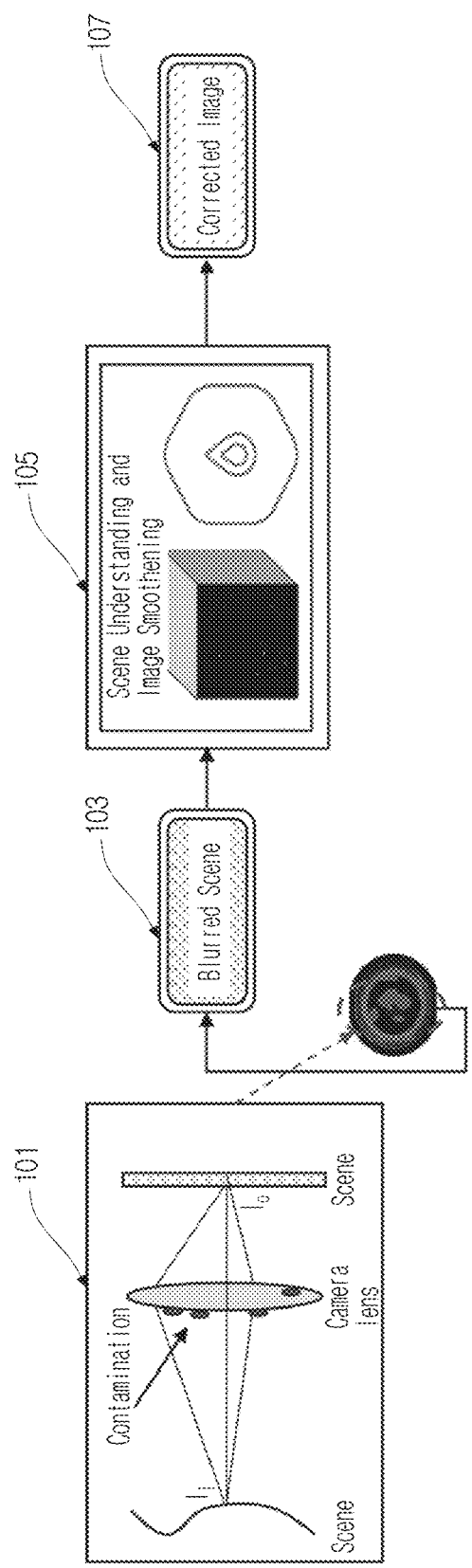
FIGS. 1A, 1B, and 1C illustrate a state of the related art.
Figure 1B:
Figure 1C:
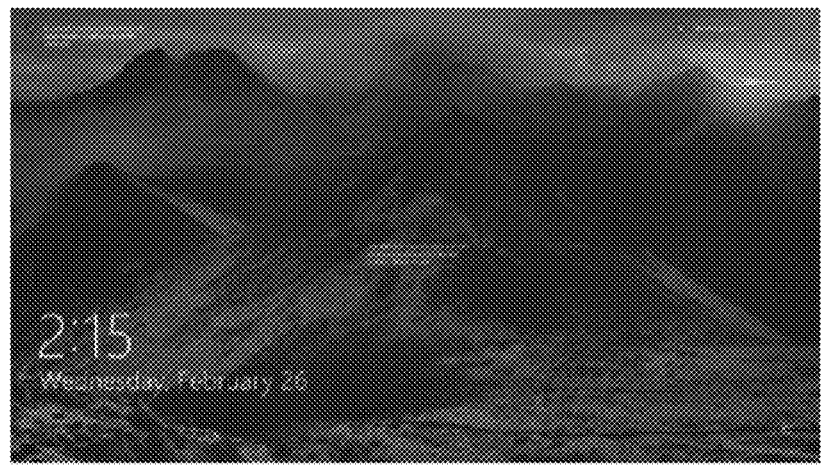

The embodiments herein and the various features and advantageous details thereof are explained more fully with reference to the non-limiting embodiments that are illustrated in the accompanying drawings and detailed in the following description, where similar reference characters denote corresponding features consistently throughout. Descriptions of well-known components and processing techniques are omitted so as to not unnecessarily obscure the embodiments herein. Also, the various embodiments described herein are not necessarily mutually exclusive, as some embodiments may be combined with one or more other embodiments to form new embodiments. The examples used herein are intended merely to facilitate an understanding of ways in which the embodiments herein may be practiced and to further enable those skilled in the art to practice the embodiments herein. Accordingly, the examples should not be construed as limiting the scope of the embodiments herein.

The term "some" as used herein is defined as "none, or one, or more than one, or all." Accordingly, the terms "none," "one," "more than one," "more than one, but not all" or "all" would all fall under the definition of "some." The term "some embodiments" may refer to no embodiments or to one embodiment or to several embodiments or to all embodiments. Accordingly, the term "some embodiments" is defined as meaning "no embodiment, or one embodiment, or more than one embodiment, or all embodiments."

More specifically, any terms used herein such as but not limited to "includes," "comprises," "has," "consists," and grammatical variants thereof do not specify an exact limitation or restriction and certainly do not exclude the possible addition of one or more features or elements, unless otherwise stated, and furthermore must NOT be taken to exclude the possible removal of one or more of the listed features and elements, unless otherwise stated.

Whether or not a certain feature or element is limited to being used only once, either way it may still be referred to as "one or more features" or "one or more elements" or "at least one feature" or "at least one element." Furthermore, the use of the terms "one or more" or "at least one" feature or element do not preclude there being none of that feature or element, unless otherwise specified by limiting language such as "there needs to be one or more . . . " or "one or more elements is required."

Unless otherwise defined, all terms, and especially any technical and/or scientific terms, used herein may be taken to have the same meaning as commonly understood by one having an ordinary skill in the art.

Embodiments of the present disclosure will be described below in detail with reference to the accompanying drawings.

FIG. 2 illustrates a method 200 for operating an imaging system in an image capturing device based on artificial intelligence (AI) techniques, according to an embodiment.

At operation 201, the method 200 comprises classifying (step 201) a noise associated with lens of an imaging device during capturing image. As an example, the noise can be a dust, water, fog, mist, haze that may present on a lens or in an environment of the image capturing device.

In an implementation, the classification of the noise comprises capturing a live-view image as the captured image. Based on the live-view image, one or more metrics are calculated. Now, based on the calculation of the metrics a notification of a blur image in the live-view image is being received. Thereafter, it is determined if a lens of the imaging device is externally contaminated based on the notification. The external lens contamination is classified as one or more type of noise through a convolution neural network (CNN) based noise classifier.

According to an embodiment of the present disclosure, the captured image is preprocessed (operation 203) based on the classified noise to compute an initial region of interest (ROI) with respect to the captured image. The computation of the initial ROI is based on determination of an negative-image of the captured image and application of one or more noise-filters that are specific to the classified noise upon the negative-image.

In an implementation, the preprocessing of the captured image comprises computing of the negative-image based on a color space to highlight a noise affected in the captured image. Thereafter, one or more noise localization mechanism is applied upon the negative-image based on selection of the one or more noise filters. The one or more noise filters are selected based on the classified noise. Thus, the initial ROI for the captured images are generated based on the application of the applied noise localization mechanisms.

In a further implementation, the noise filters applied over the image negative are defined as one or more of fog filter, water filter or dust filter. As an example, the fog filter is applied by a linear transformation criteria based on a plurality of parameters comprising brightness, contrast and luminance associated with the negative-image of the captured image. In another example, a water or dust filter is applied by an edge detection criteria comprising a threshold calculation based on one or more computed medians of the image negative. Then a morphological closing process is performed on the negative-image by a plurality of shape expansion steps followed by a shape reduction step, thereafter an outlier is being removed.

The preprocessing step (operation 203), further comprises extracting a plurality of features defined by one or more of significant component vector and hardware parameter vectors for the captured image based on the classified noise by a plurality of a hardware parameter prediction blocks, the hardware parameter prediction blocks corresponding to pre-trained networks for correcting images affected by one or more of dust, fog and water droplets based contamination. The hardware parameter prediction blocks then predict a plurality of commensurate hardware parameters based on the vectors.

Further, based on one or more of: the initial ROI and the captured image a first processed image is being partially reconstructed (operation 205) through a deep learning network. Thereafter, a preview of the first processed image is being rendered (operation 207) and based thereupon a passive user input is received which is directed to a portion of the rendered preview of the image. As an example, the passive user input may be alternatively used with a passive user feedback in the description without deviating from the scope of the disclosure. In a further implementation, the partial reconstruction resulting into the first processed image is followed by subjecting the first processed image to an image processing based on the predicted plurality of commensurate hardware parameters for rendering the preview of the first processed image, the first processed image having been reconstructed from the deep learning network.

At operation 209, an additional ROI for the captured image is generated based on computing an ROI positioned within the initial ROI or at least partially outside the initial ROI based on the passive user input and the classified noise. The generation of the additional ROI based on the passive user input towards the portion of the first processed image comprises determining location-coordinates of the portion. The determination of location coordinates of the portion is performed by sensing at least one of: a contact executed by the user over the first processed image, a gesture executed by the user and directed to the portion of the first processed image or an utterance mentioning the portion within the first processed image. The location coordinates are ascertained to be positioned inside the initial ROI. Thereafter, noise localization defined by application of a shape-reduction based operation is applied against the location coordinates to generate the additional ROI for the captured image. The additional ROI corresponds to a smaller area than the initial ROI. Alternately, the coordinates may be ascertained to be positioned as being outside the initial ROI. Thereafter, noise localization defined by application of a shape-expansion based operation is applied a plurality of times in accordance with the classified noise, wherein the application of noise-localization is performed against the location coordinates to generate the additional ROI for the captured image.

Further, based on the additional ROI and the captured image a second processed image is being reconstructed (operation 211) through the deep learning network to thereby generate a user-personalization based noise-corrected image. In a further implementation, the significant component vector and hardware parameter vectors are modified in accordance with the location coordinates to predict a plurality of commensurate hardware parameters by the blocks based on the modified vectors, thereby facilitating an image processing of the second processed image for rendering a preview of the second processed image to the user. The image-processing of the second processed image for rendering preview of the second processed image comprises receiving the second processed image reconstructed from the deep learning network. Then, the predicted hardware parameters are applied to the second processed image during a digital image processing of the second processed image. Thereafter, a final image is generated based on the digital image processing for preview by the user, the final image defined by correcting the classified noise based on application of CNN and predicted hardware parameters.

In an implementation, the passive user input as mentioned above as directed to the portion of the first processed image is defined by a touch for focus setting or eye gaze information to enable computation of the additional ROI for the captured image. Further, pre-processing of the captured image and the reconstruction of the first processed image as explained in operations 203 and 205 corresponds to a predetermined criteria or a dynamically determined criteria. The dynamically determined criteria is defined by a real-time determination of a type of one or more of noise-filters for localizing the classified noise, deep learning network, and one or more hardware parameters for application upon the first processed image to render a preview of the first processed image.

Furthermore, the additional ROI and the predicted hardware parameters are based on the passive user input collectively define a user personalization parameter. The user personalization causes one or more of reconstruction of the second processed image as a user-personalized reconstruction; and generation of the final image based on the digital image processing as a user-personalized image.

Referring now to the drawings, and more particularly to FIGS. 3-8, where similar reference numerals denote corresponding features were consistently used throughout for the sake of brevity in the preferred embodiment.

FIG. 3 illustrates a detailed implementation of a method 200 as explained in the FIG. 2, in accordance with an embodiment of the present disclosure and accordingly refers a method for image-correction based on lens anomaly.

Operation 300-1 refers capturing a live-view image of a scene using an image capturing device while receiving a passive-feedback of a user, processing the live-view image to detect a blurred area in the image and detecting the blurred area caused by an anomaly related to lens of the image capturing device, thereby corresponding to the operation 201.

Operation 300-3 refers categorizing the noise in the blurred area to detect type of anomaly using a class based filtering approach, thereby corresponding to the operation 201.

Operations 300-5 and 300-7 both correspond to the operation 203 and refers applying at least one of hardware and machine-learning (ML) based correction for correcting the image. The hardware correction is application of selected-hardware setting using a predictive method. The ML based correction is executed by using negative-image and noise localization.

Operation 300-9 refers reconstructing the image with applied correction on live-view and correspond to the operation 205.

Figure 4:
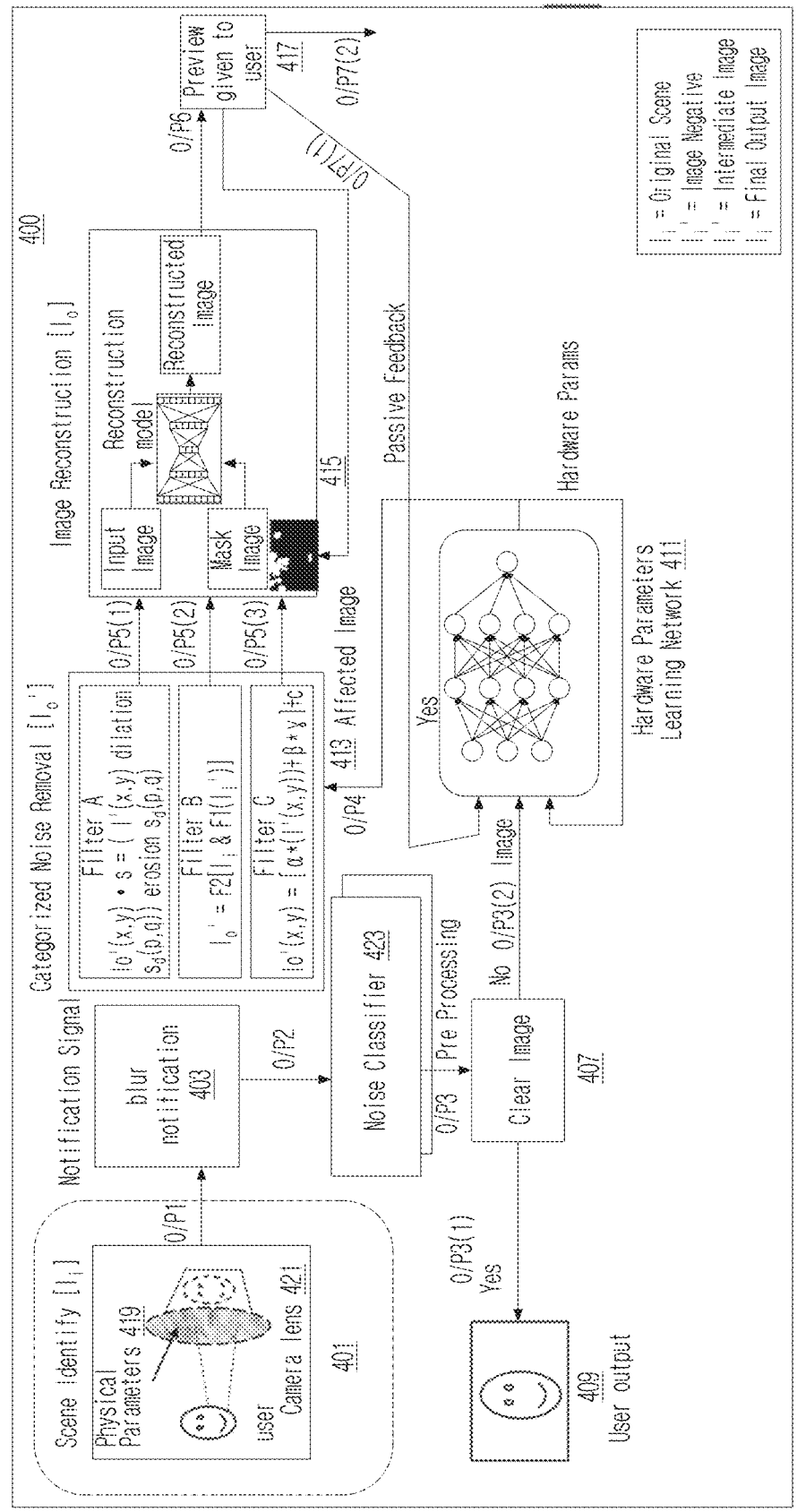
FIG. 4 illustrates a system architecture in accordance with an embodiment.

FIG. 4 illustrates a block diagram of the present disclosure with respect to FIG. 3 and accordingly illustrates an implementation of the method steps provided in FIG. 2. Accordingly, the method 200 may be implemented in the five major operations of (1) Initialization 300-1, (2) Noise categorization 300-3, (3) Parallel Processing of Hardware and Machine learning (ML) criteria Parameters 300-5, (4) Personalized Preview Processing 300-7, (5) Output Generation 300-9.

According to an embodiment of the present discloser, during the initialization operation 300-1, a scene is focused by the user (at operation 301) to capture the live image through the imaging system of the image capturing device. After capturing the image, the scene is identified (at block 401) for the presence of any blur on the captured image. The identification is performed by calculating one or more physical metrics/parameters 419 on the camera lens 421. If any blur is present in the captured image (at block 305) then a notification signal O/P1 is generated to provide blur notification 403

According to further embodiment of the present discloser, the notification signal is then provided to the noise classifier 423 for preprocessing 203 as explained in FIG. 2. In case a clear image 407 is being determined or no blurry scene is being determined then the captured image is being outputted to the user as shown in the blocks 409, block 309 without doing any further processing.

After, initializing hardware and machine learning (ML) criteria parameters, the process moves to Noise categorization 300-3. Input scene image is classified in a particular class based on type of noise or contamination present on lens as explained in operation 201 of FIG. 2. As an example, fog, dust and water droplet contamination are considered as predetermined categories of noise. However, the categorization of noise is not limited to these three categories. In order to classify the noise, a pre-trained convolutional neural network (CNN) model based noise classifier is utilized to classify the image in one of the three categories as shown in blocks 311 and 413. The convolutional neural network (CNN) model based noise classifier as shown in FIG. 4 at block 413 comprises one or more specialized noise filters for example, but not limited to, fog-filters, water or dust filters and the like. The detailed implementation of the specialized filters will be explained in the forthcoming sections.

After, classification of the noise, the process moves to parallel processing of hardware and machine learning criteria parameters at operation 300-5. In this process the image is passed to both hardware parameter prediction at block 313 and Machine learning criteria processing at block 325. Both of the blocks perform image processing at block 319 simultaneously. The hardware parameter prediction block 313 predicts best fit hardware parameter values as per initial training and given class of the image. Machine learning criteria processing at block 325 calculate filters for preprocessing based on Image class. Machine learning criteria processing at block 325 also computes image negative for noise localization at block 315 and perform image reconstruction using original/input image and affected area/mask image having initial ROI as explained in the step 205 of FIG. 2. The detailed implementation of the image negative and noise localization will be explained in detailed in the forthcoming paragraph.

Thereafter, the process moves to parallel processing of hardware and machine learning criteria Parameters at operation 300-7. The Predicted hardware parameters as predicted in block 313 were applied on reconstructed image from machine learning criteria at block to generate preview 321, 417 which is directly shown to the user as explained in the step 207 of FIG. 2. User gives feedback/passive feedback which is processed during the runtime. The user feedback is provided to hardware agent or hardware parameter prediction block. The generated preview will also be fed back to machine learning criteria processing block to generate an additional ROI which can be within the initial ROI or outside the initial ROI as explained in operation 209 at FIG. 2. Accordingly, the image is processed again to reconstruct a second processed image as explained in operation 211 of FIG. 2.

After that, the process moves to output generation at operation 300-9. The second processed image will be provided as second preview to the user to capture the final image 300-9 from the current frame. The reconstruction of the second processed image may be continuous process depending upon the user passive feedback. In particular, the hardware and machine learning criteria parameter get converged due to iterative input by using data received from user feedback. Thus, the number of preview of the second processed image will depend upon a number of times the user passive feedback is being received. Thus, a user-personalized based noise-corrected image is generated from the above implementation.

FIGS. 5A-10B illustrate various components of a system as described in FIG. 4 implementing method as described in FIGS. 2 and 3, according to an embodiment of the present disclosure. As explained above the method 200 may be implemented in five major operations i.e. (1) Initialization 300-1, (2) Noise categorization 300-3, (3) Parallel Processing of Hardware and Machine learning criteria Parameters 300-5, (4) Personalized Preview Processing 300-7, and (5) Output Generation 300-9. According to an aspect of the disclosure the major steps is being performed by the component i.e. initializer, image correction agent, user feedback system and image previewer respectively. A detailed implementation will be explained in below by referring to FIGS. 5A-10B.

Figure 5A:
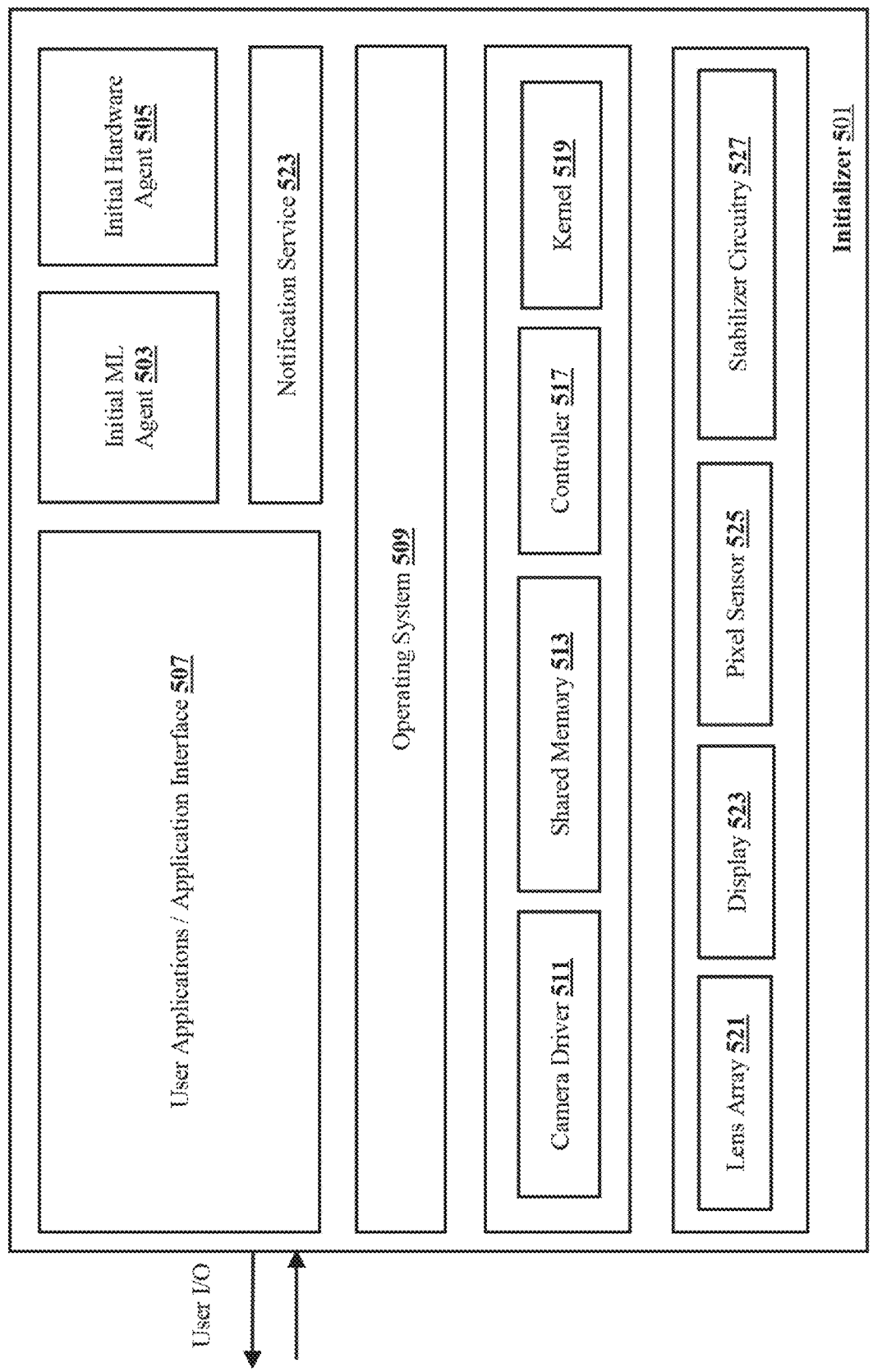
FIGS. 5A and 5B illustrate a detailed implementation of initializer along with flowchart, according to an embodiment.
Figure 5B:
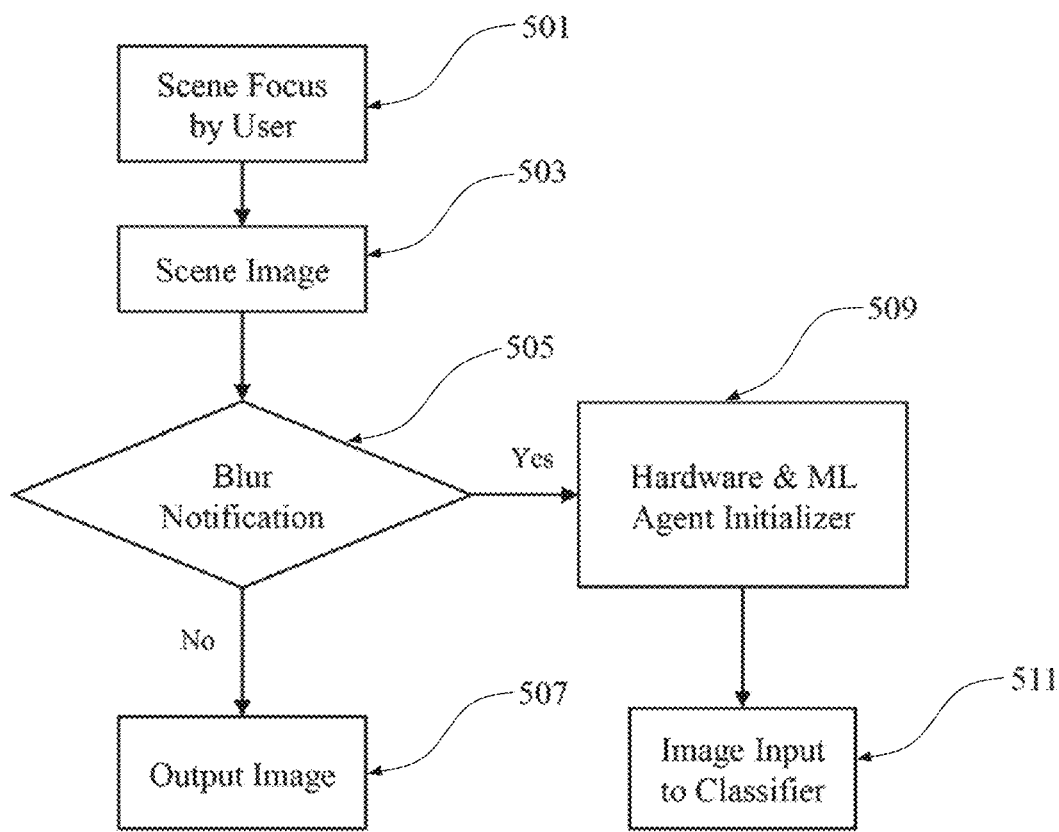

FIG. 5A illustrates a detailed implementation of initializer, according to an embodiment of the present disclosure. The initializer 501 may include Initial Machine learning criteria Agent 503, Initial Hardware Agent 505, User Applications/Application Interface 507, Operating System 509, Camera Driver 511, Shared Memory 513, Controller 517, Kernel 519, Lens Array 521, Display 523, Pixel Sensor 525, and Stabilizer Circuitry 527. The aforementioned components are coupled with each other. The initializer 501 may be configured to perform mechanism by the Initialization 300-1 as explained in the FIG. 4 above. Further, FIG. 5B illustrates an overall flow of the initializer 501. The operations at blocks 501, 503, 505, 507, 509, and 511 corresponds to operations 301, 303, 305, 309, and 307 of FIG. 3 respectively. However, the description made herein for detailed implementation of the hardware and machine learning criteria agent initialization block 509.

According to an embodiment of the present disclosure, once notification of blurry image/scene is being received from the notification service 523, hardware and machine learning criteria agents are invoked. The Initial Machine learning criteria Agent 503 and Initial Hardware Agent 505 are configured to invoke the machine learning criteria and hardware parameter. In particular, when source light does not converge on sensor of the camera lens 421 properly, image is blurred. An image blur is represented as a mathematical convolution between the source image and the point spread function which is known as the blurring kernel. Upon reception of image data as blurred, notification service function, and with blur flag agents are invoked as function of notification as shown in equation 1 and 2

$$\text{void Notification(Input buffer: Scene image, notification flag: Yes)} \quad (1)$$

$$f = f_0 \otimes k(d) + \eta \quad (2)$$

Where, $f_0$—the latent in-focus image k—point spread function

η—image noise which is assumed to be Gaussian white noise N(0, σ2)

Based thereupon hardware and machine learning criteria agents initialize hardware and machine learning criteria parameters through a hardware parameter learning network 411 as shown in block 307. In particular, weights are initialized using random values with some heuristics to scale the weights which keeps values (mean of 0 and standard deviation of 1) depending on the activation function. Bias values could be initialized with zero. The initialization parameter is based on the following function as shown in equation 3.

$$\text{void Initialization(param1: weights, param2: bias)} \quad (3)$$

Figure 6A:
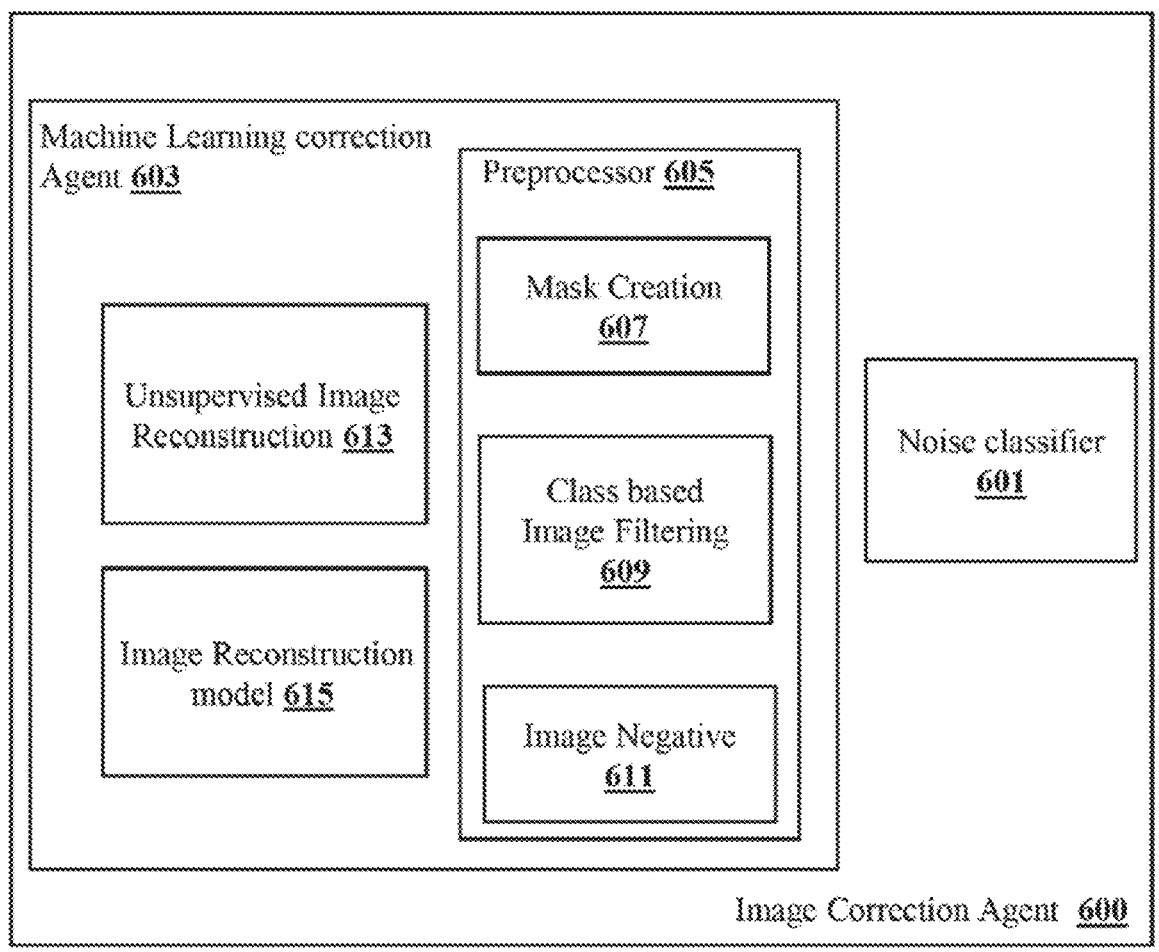
FIGS. 6A to 6F illustrate an Image Correction Agent along with flowchart, according to an embodiment.
Figure 6B:
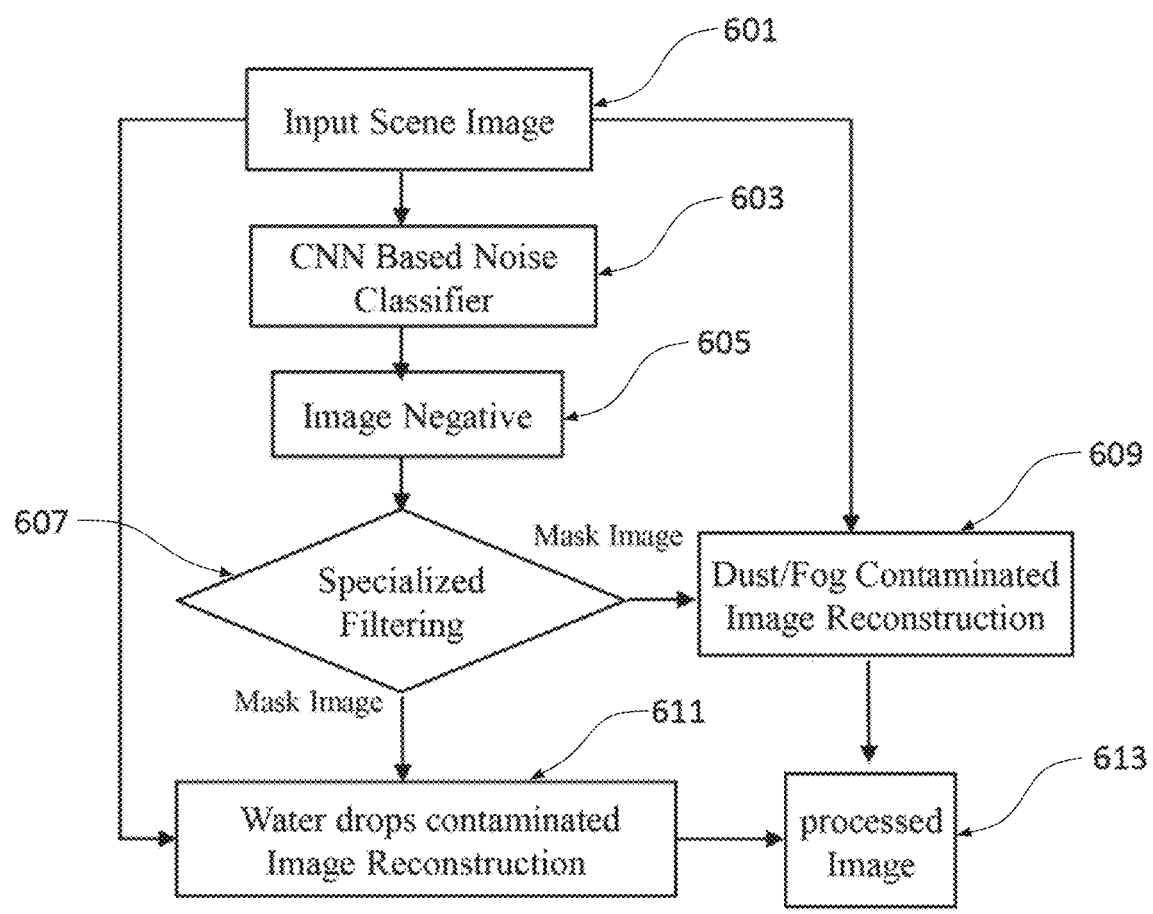
Figure 6C:
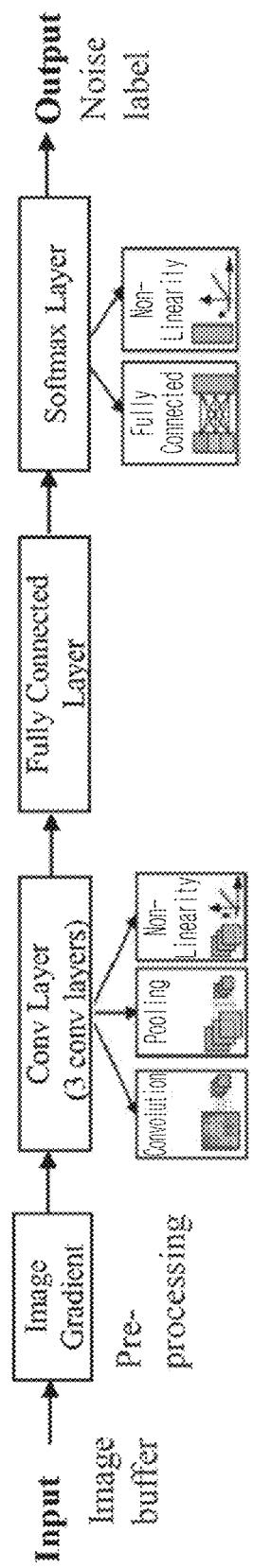

FIG. 6A illustrates an Image Correction Agent, according to an embodiment of the present disclosure. An Image Correction Agent 600 may be at least include machine learning criteria correction agent 603, a noise classifier 601. The machine learning criteria correction agent further includes preprocessor 605, mask creation 607, class based image filtering 609, Image negative 611, unsupervised image reconstruction 613, and image reconstruction model 615. The function of noise classifier 601 is same as noise classifier 423 as explained in FIG. 4. FIG. 6B shows a flow chart of the Image Correction Agent 600. Explanation has been made herein in particular to mechanism of the noise classifier. As an example, the noise classifier 601 may be a Convolutional Neural Network (CNN) based pre-trained model. In an implementation, the noise classifier 601 may be configured to receive input scene image (601). The query image may contain image buffer which is affected by any type of lens contamination. After receiving an input scene image, the CNN based noise classifier 423 may be configured to label incoming input scene image based on noise present in it. As an example, each type of lens contamination creates a unique pattern which can be used as a natural fingerprint for it. The noise classifier 423 classifies input image noise type using these patterns and assigns dust, fog, water droplets noise type labels to input scene image to classify the noise type and fed this data into Machine learning criteria Correction Agent's Preprocessor module 605 for further processing. In principle, as the high frequency components are preserved in contaminated image, this property is being utilized by passing Image gradient or a high pass filtered image as input to the noise classifier 601 as shown in FIG. 6C. The noise classifier 601 may be configured to calculate a one or more metric or feature vector by using three convolutional (Cony) layers and then passing through a fully connected layer with three dimension softmax at the end to classify among the noise types.

Referring to FIG. 6A, the preprocessor 605 may be configured to receive the input scene image and noise type as an input and preprocesses for noise localization to compute negative-image of the scene. The computation of the negative-image is performed by image negative 611 based on color space to highlight a noise affected region in the captured image. In particular, the negative-image is calculated using saturation buffer of Hue, Saturation and Value (HSV) color space to highlight the affected region by noise. The negative-image mechanism is based on the following function as shown in Equation 4 below.

$$\text{negative\_image ImageNegative(Input buffer: Scene image)} \quad (4)$$

Figure 6D:
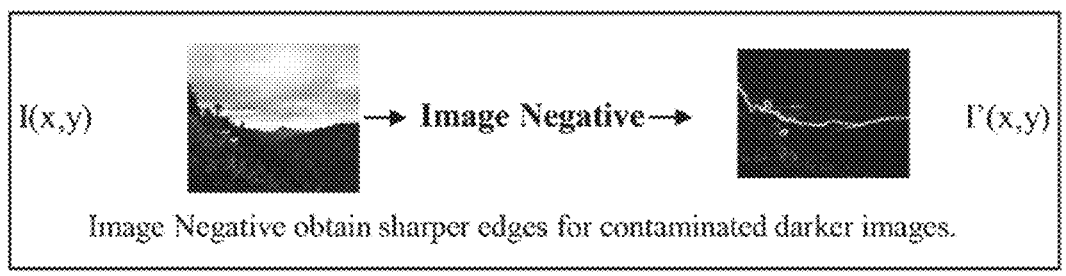

The mechanism of negative-image takes original image buffer as input and gets saturation component of image which will be used as image negative as shown in FIG. 6D. Thereafter, one or more noise localization mechanism is applied to the negative-image by selecting an appropriate the one or more noise-filters based on the classified noise. Such filtering is termed as specialized filtering as shown in the block 607 and performed by the class based image filtering 609. In an implementation, the class based image filtering 609 performs the specialized filtering may be able to handle different types of noise by applying separate filters for each noise type. These filters are designed according to the characteristics of each noise type. It takes noise type and negative image, apply filters accordingly to create mask image based on equation 5 as follows. The mask creation 607 generates an extracted region of interest (ROI) or affected area or initial ROI or a mask image of input scene image.

$$\text{mask\_image GetFilter(Input params: noise\_type, image buffer: negative\_image)} \quad (5)$$

As an example, three type of specialized filter has been uniquely designed based on the classified noise as fog, dust or water. In an implementation the fog filter is a modified linear transformation filter. Gamma multiplication and fixed constant addition in filter gives better detailing of the captured image. The mask image generated by applying fog filter is given by following equation 6 and 7.

$$\text{mask\_image} = [\alpha*(I'(x,y)) + \beta*\gamma] + c \{\alpha = \text{contrast},\\ \beta = \text{brightness}, \gamma = \text{luminance}, c = \text{constant } b/w \text{ 0 to}\\ 1\} \text{ [applied over each pixel value of negative image } I'(x,y)] \quad (6)$$

$$\text{mask\_image FogFilter(image buffer: negative\_image)} \quad (7)$$

Figure 6E:
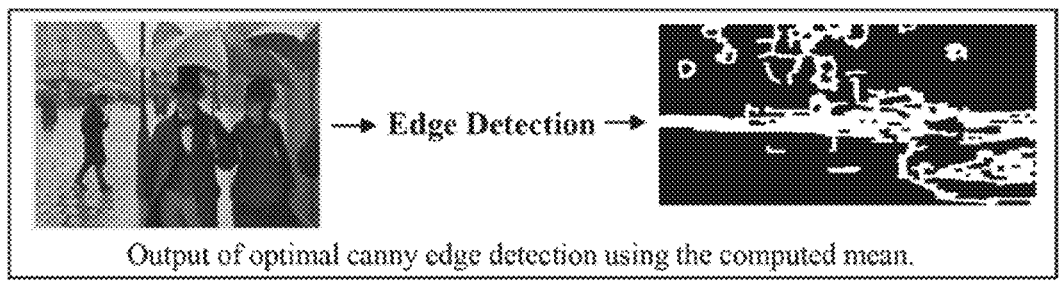

In a further implementation, referring FIG. 6E, the water or dust type of filter performs specialized filtering initially by performing edge detection. The edge detection mechanism includes a threshold calculation based on one or more computed medians of the image negative. The detailed mechanism of performing edge detection is as follows:

In an implementation and as a first step, a canny edge detection may be used to get edges or gradients of the image. In particular, a Non Maximum Suppression step of canny edge detection is advantageously executed by calculating upper and lower thresholds of canny edge detector using the computed median of negative image. This method of adaptive thresholding is very effective in order to preserve all significant edges of image.

In an example implementation, the image I is divided into 4 parts I1, I2, I3 and I4 with respective medians Mdn1, Mdn2, Mdn3 and Mdn4 to compute one or more median based on following equations:

$$l\_Mdn = \min(Mdn1, Mdn2, Mdn3, Mdn4)\{\text{minimum median out of 4 medians}\} \quad (8)$$

$$H\_Mdn = \text{avg}(Mdni, Mdnj, Mdnk)\{\text{remaining three medians}\} \quad (9)$$

$$Mx\_Mdn = \max(Mdn1, Mdn2, Mdn3, Mdn4)\{\text{maximum median out of 4 medians}\} \quad (10)$$

$$\text{lower\_thresh} = ((1.0-\alpha)*l\_Mdn)\{\sigma=\text{sigma to smooth image}\} \quad (11)$$

$$\text{upper\_thresh} = \max(Mx\_Mdn, (1.0+\sigma)*H\_Mdn) \quad (12)$$

$$\text{edge\_image EdgeDetection(image buffer: negative\_image)} \quad (13)$$

After, edge detection, a morphological closing process is performed. The morphological closing process includes a plurality of shape expansion steps followed by a shape reduction step. The detailed explanation of the morphological closing process comprises initially performing, the closing of image I' through a structuring element s (denoted by I's) as a dilation followed by an erosion:

$$I'(x,y)\cdot s = (I'(x,y)\text{dilation } sd(p,q))\text{erosion } sd(p,q)\{\text{structuring element size: (3,3)}\} \quad (14)$$

According to an embodiment of the present disclosure, the closing operation is used with modification. In particular, dilation process is used twice followed by erosion. As edges in contaminated region could not be that smooth to clearly identify the shape or object, therefore two times dilation process is being performed. Equation 15 depicts the same.

$$\text{morph\_image Morphology(image buffer: edge\_image)} \quad (15)$$

Figure 6F:
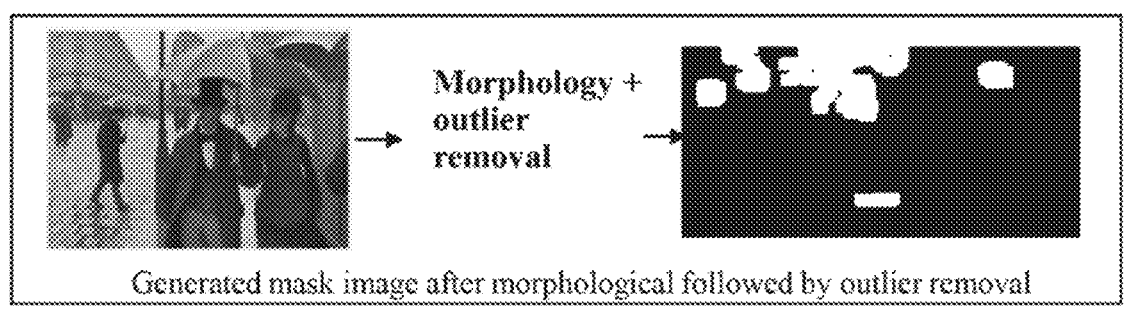

Further to the morphological closing an outlier removal step is performed. In this step shape and size analysis of connected components is done. Insignificant components (very small area, size) called as outliers, will be removed as shown in FIG. 6F. Equation 16 depicts the function of morphological closing $$\text{mask\_image RemoveOutlier(image buffer: morph\_image)} \quad (16)$$

In a further implementation, a mask refinement process may be performed using passive feedback from the user if any as next step. In this step generated mask will be refined using window chosen by user in the form of passive feedback. The following equation 17 denotes the mask refinement process.

$$\text{mask\_image RefineMask(image buffer: morph\_image, ip param1: passive feedback, ip param2: mask\_image)} \quad (17)$$

Referring back FIG. 6A, the unsupervised image reconstruction 613, and image reconstruction model 615 may be configured to reconstruct at least partially a first processed image based on one or more of: the initial ROI and the captured image through a deep learning network. The reconstruction step is same as that of block 415 of FIG. 4 as explained above. In particular, only the initial ROI is taken into account for reconstruction and thereby avoids a large dataset. The reconstruction of the image uses convolutional neural networks to reconstruct image using its prior information. The input scene image will be reconstructed using mask image. As explained earlier separate models exists for each noise_type and according to noise_type reconstruction model will be selected. Accordingly, based on the contamination type the image is being reconstructed as shown in block 609 and 611. Following equation 17 is being utilized for image reconstruction.

$$\text{processed\_image ImgReconstruction (Input buffer: Scene image, Input buffer: mask\_image, Input param1: noise\_type)} \quad (18)$$

Figure 7A:
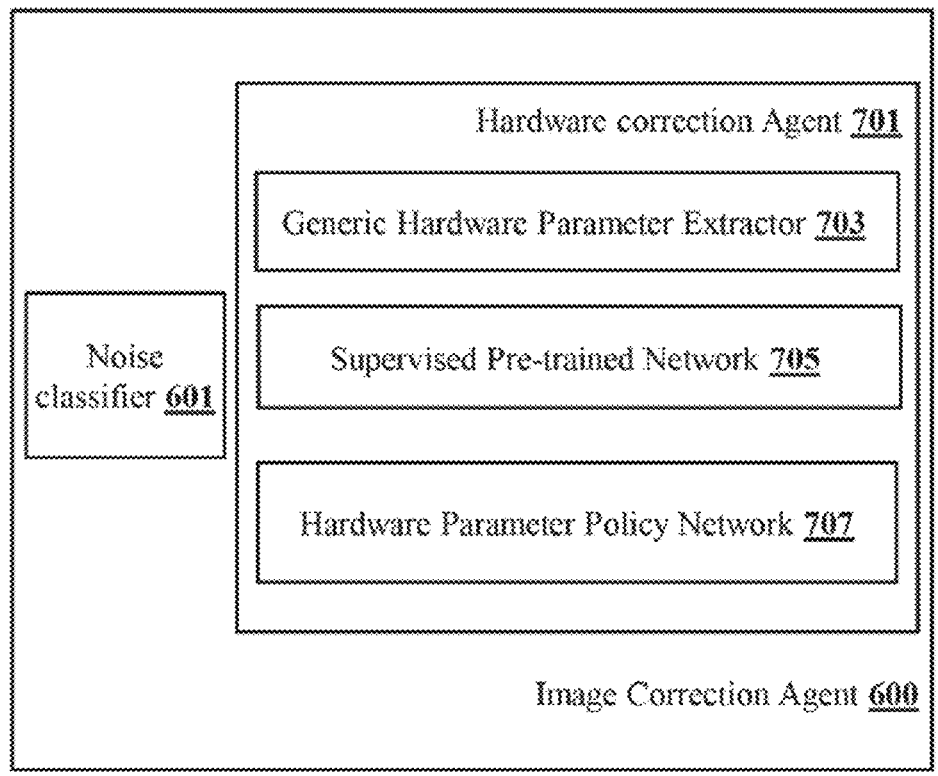
FIGS. 7A, 7B, and 7C illustrate a Hardware Correction Agent along with flowchart, according to an embodiment.
Figure 7B:
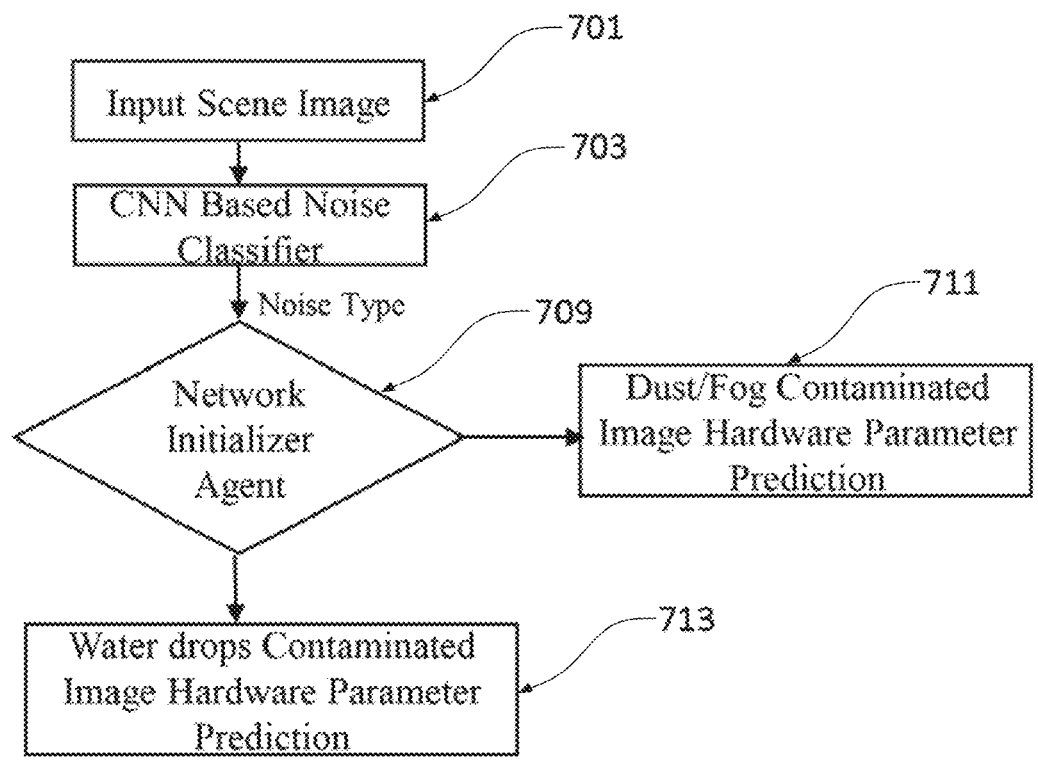

FIG. 7A illustrates a Hardware Correction Agent, according to an embodiment of the present disclosure. The image Correction Agent 600 may further include Hardware Correction Agent 701. The hardware correction agent further includes Generic Hardware Parameter Extractor 703, Supervised Pre-trained Network 705, Hardware Parameter Policy Network 707. As an example, Hardware Correction Agent 701 works in parallel with machine learning criteria correction agent 603. The Hardware Correction Agent 701 may be configured to calculate best hardware vector parameters to enhance the input scene image. As an example, there are three kind of supervised pre-trained models. Each of them is trained for images distorted by that particular noise type and the labels are best-suited hardware parameters to enhance the image. Further, the network initializer agent 709 is an interface to initialize aforementioned networks. Input to this module is input scene image and noise type given by noise classifier module and passive and active feedbacks given by user (if any). According to noise type the network initializer agent 709 will invoke respective network as shown in equation 19. In an implementation the steps at block 701 and 703 corresponds to operations 601 and 603 of FIG. 6, therefore for the sake of brevity it is being omitted.

$$\text{net\_object InitHardwareAgent(Input buffer: Scene image, Input param1: noise\_type, Input param2: passive feedback, Input param3: active feedback factors)} \quad (19)$$

As an example, pre-trained networks are provided for images affected of dust, fog and water droplets lens contamination. The hardware correction agent 701 may be configured to predict most suitable hardware parameters for input noisy scene image. The function is being defined by equation 20.

$$\text{predicted\_params HPPNetwork(Input buffer: Scene image, Network instance: net\_object)} \quad (20)$$

For a set of noisy images (for each noise type) and corresponding clear images, the minimum difference between hardware parameters of both the images may be ($\Delta H$). At least an objective may be to minimize the difference between hardware parameters of both the images ($\Delta H$).

Considering the Loss function could be as follows for each value of hardware-parameter.

$$L = \frac{1}{N}\sum_{i=1}^{N}((F(H_i) - G(i))^2 \quad (21)$$

Where, G(i) is ground truth hardware parameter vector of each image.

F(Hi) is hardware parameter prediction function.

Figure 7C:
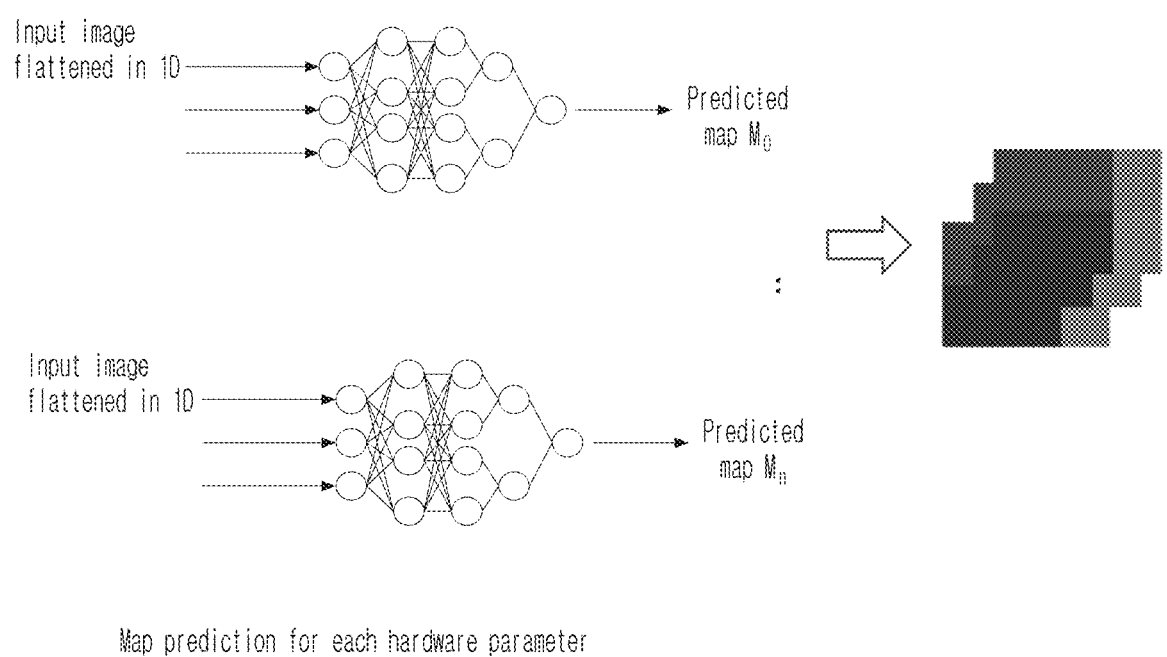

In an implementation, a plurality of features defined by one or more of significant component vector and hardware parameter vectors for the captured image based on the classified noise by a plurality of a hardware parameter prediction blocks are extracted. As a further example, the hardware parameters vectors may be attenuated by a factor in noisy regions of image. To calculate that factor a supervised pre-trained network 705 a supervised hardware parameter vectors maps has been created such as M {M1, M2 . . . Mi} for each parameter H {H1, H2 . . . Hi}. These maps are arrays of input image size, which contain corrected parameter values for different region of image which minimize ΔH. Application of these pretrained parameters given in maps will provide an initial corrected image (in terms of hardware parameters) as shown in FIG. 7C. Table 1 shows Map prediction for each hardware parameter based on the lens contamination type to implement mechanism at blocks 711 and 713.

TABLE 1

| Lens Contamination Type | H/W Parameters(example) |
|---|---|
| Fog | [∂(ExpTime), ∂(ISOVal), ∂(W/B)] |
| Dust/Water Droplets | [∂(ExpTime), ∂(ISOVal), ∂(W/B)] |

Figure 8:
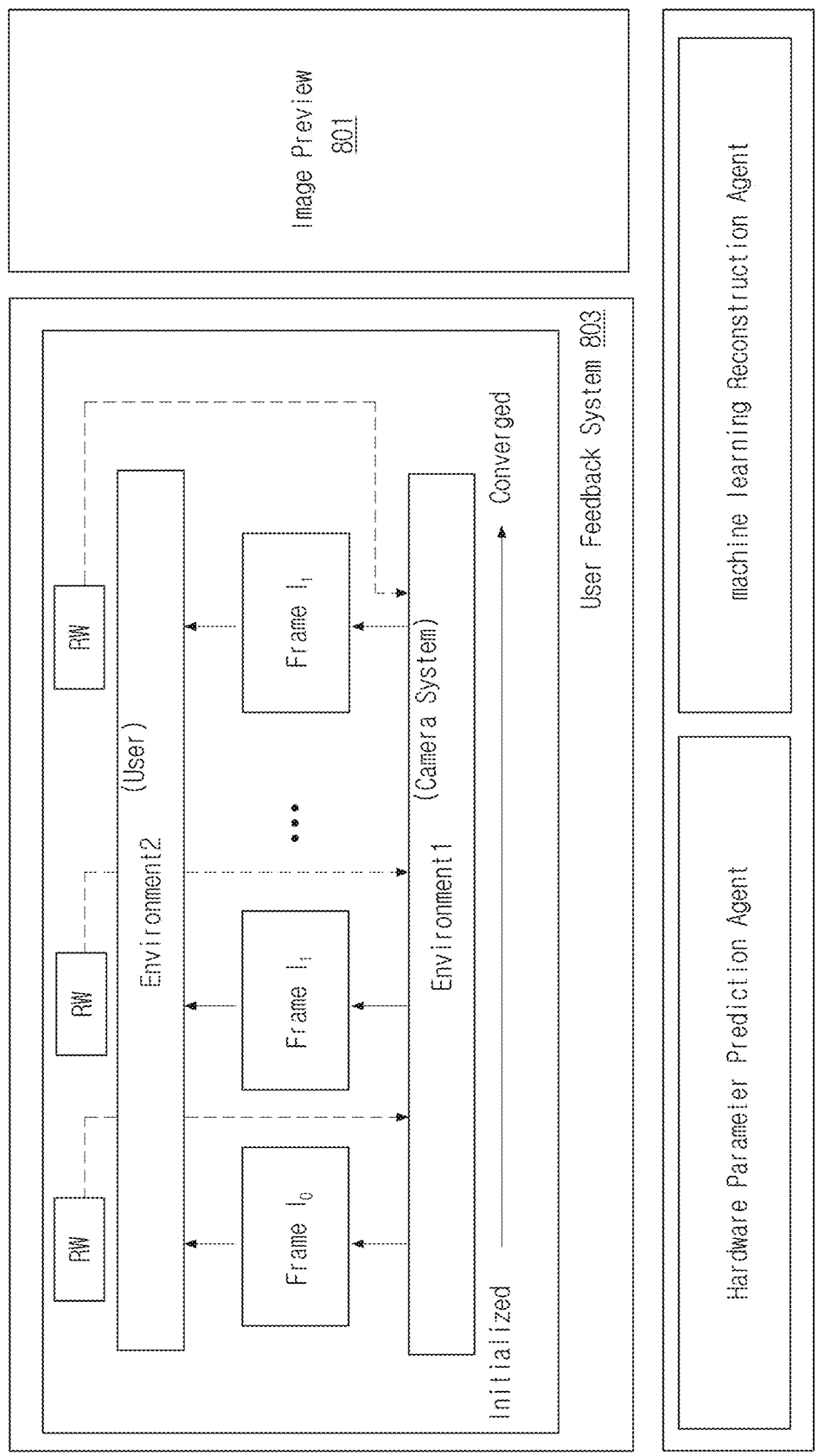
FIG. 8 illustrates an image preview module and User Feedback module comprising in a system, in accordance with an embodiment.

FIG. 8 illustrates an image preview module comprising in a system, in accordance with an embodiment of the present disclosure. The image preview module 801 may be configured to perform mechanism of Personalized Preview Processing 300-7 as explained in FIG. 3. In an implementation the image preview module 801 is a decision making module for generating final output image. In an implementation, the live focus feature works only when, there is enough and clear light and bokeh effect changes with user selection. Now, on localized noise, hardware and machine learning criteria processing are applied and enhanced image is presented to user in the form of preview. Upon user's passive action every time, new preview is presented. "Image capture" and "feedback on real time image preview" are two parallel processes. Every feedback is collected and image area is sent to machine learning criteria processing block to check with the noise localize vector and further fed into network. Best image is captured when network gets converged. Final captured image will be the best possible with personalized hardware and machine learning criteria parameters combination. The following function denotes the function of the image preview.

preview_image GeneratePreview(Input buffer: processed_image, H/W params: predicted_params)  (22)

For a given image, the preview image is given by:

$$Pi(x,y)=\sum_{i=1}^{n}F(Hi)\rightarrow I(x,y) \quad (23)$$

Where F(Hi) is the vector of n Hardware predicted parameters and I(x,y) is the processed image. The equation 23 can be interpreted as: the value of preview Image. The Predicted hardware parameters will be applied on machine learning criteria reconstructed image to generate preview image.

FIG. 8 illustrates a User Feedback module comprising in a system, in accordance with an embodiment of the present disclosure. In an implementation, the User Feedback module 803 converts generic hardware and machine learning criteria parameters to personalized parameters. Here user feedback is passive user input. In particular, passive feedback is defined as set of events unknowingly triggered by user like manual scene focusing tap events etc. The passive user input is utilized to optimize processing of the noise in the initial ROI. Whereas active user input is based on a Reinforcement Learning. Referring to the FIG. 8, the Environment1 and Environment2 together creates Environment of reinforcement model. Environment1 corresponds to Camera system that gets commands of newly calculated parameters. And environment2 is User active input. The RW represent reward is active feedback given by user by any means. Agent is processing algorithm of reinforcement model. Here there are two types of agents, Agent1 is Hardware Parameters Prediction Agent (HPPA) and Agent2 is Machine learning criteria Reconstruction Agent (SRA).

Figure 9A:
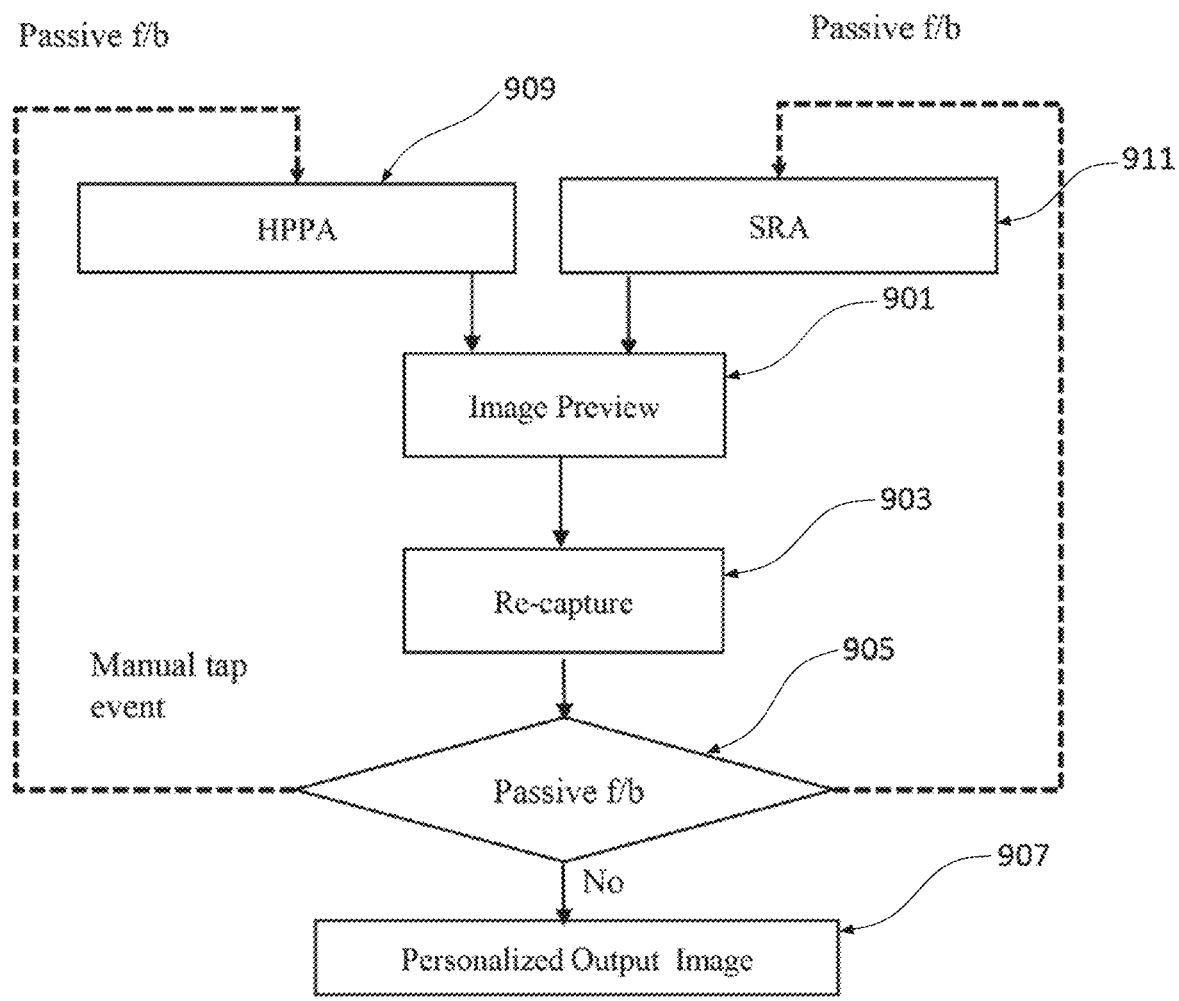
FIG. 9A to 9E illustrate a flow chart for the implementation of the Passive user input in accordance with an embodiment.
Figure 9B:
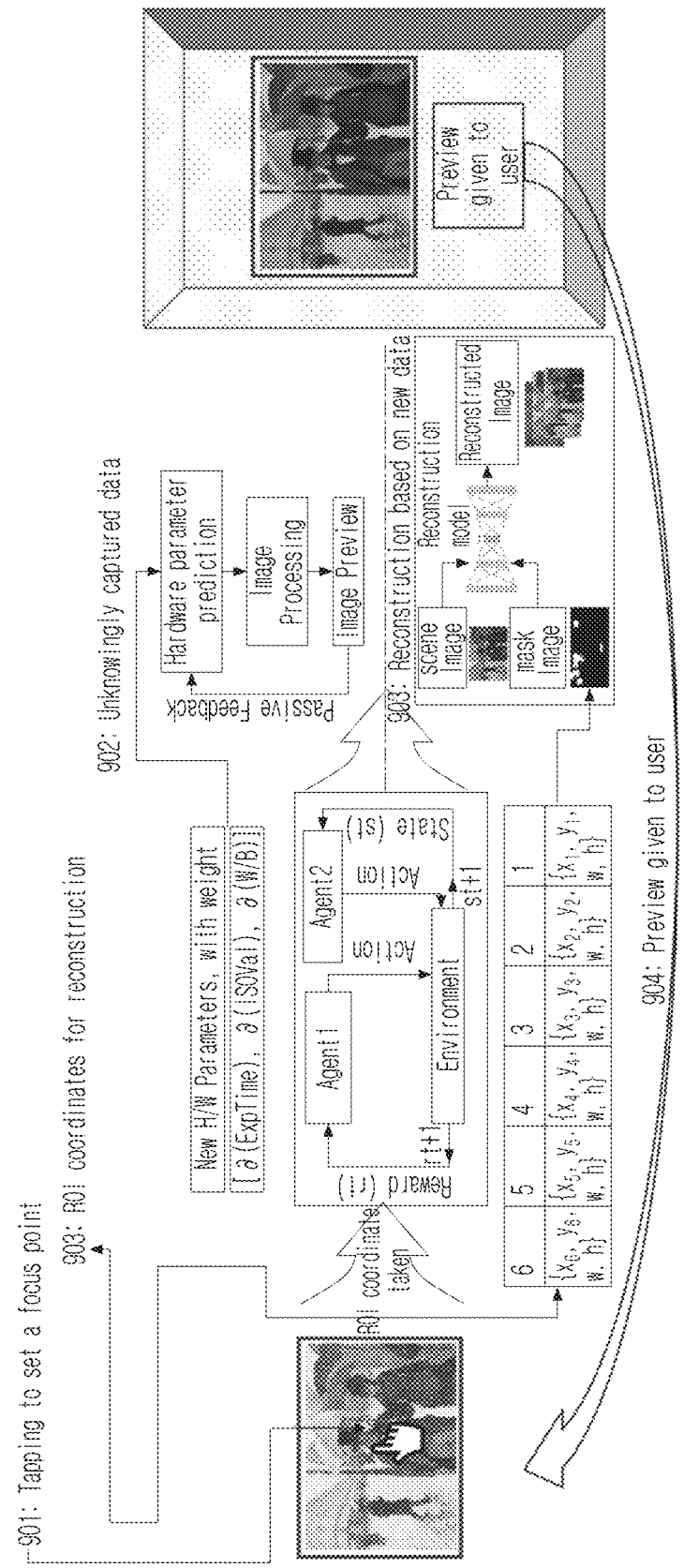

FIGS. 9A and 9B illustrate a flow chart for the implementation of the Passive user input under various scenarios and their effect upon the state of the art mechanisms.

In an implementation as shown in FIG. 9A, based on passive feedback (905) HPPA calculate maps of regions chosen by user feedback and its closed neighborhood regions only. Other maps treated as outliers, which in turn improves the performance in terms of time. Thereafter, SRA calculates image mask, by using passive feedback window (911) it can refine the calculated mask based on user choice.

Following FIG. 9B to FIG. 9E refers example user feedback mechanisms in respect of steps 203 to 211 of FIG. 2.

FIG. 9B refers an explanation of example user feedback. As may be observed from peculiarities of general public at large, a common is observed as pretty habitual of touching the screen for focusing on area of interest and for clearing some areas which are blurred. While focusing on a blurred scene tap or touch event produced by user will become passive feedback for the present system. Such kind of events produced by user may be appropriated to enhance the accuracy and performance of the present subject matter. It is a natural user interaction with the device that we are capturing.

Example steps for novel passive feedback may be provided as follows:

Operation 901: When lens is contaminated, it generates deblur focus. Initial reconstruction with initial contaminated area mask has already completed once, before generating preview.

Operation 902: User tap to focus on highlighted area of screen, which may be deemed as a Natural Interaction. Based on user interaction (Passive feedback), those areas will be used for further mask creation. More specifically, operation 902 refers mask-creation wherein 'Initial Mask' has been generated based on overall scene contamination. The user interest is captured via passive feedback and mask is refined for further image enhancement.

Operation 903: With above interaction, ROI coordinates are sent to Machine learning criteria correction agent, and new mask based on prioritized selection is generated and used. With above interaction, by using user-defined region new User Defined Mask image gets generated. This mask will be a subset of original mask. Accordingly, reconstruction takes place including updated mask. Specifically, operation 903 refers a prioritized mask ROI that corresponds to a reduced set of ROI, which is subset of original ROI but based on user choice Operation 904: Based on preview, new HW Parameters weightage is changed, so for next time learning can be fast for personalized parameters. Image Reconstruction will be much faster when using user defined mask image. In other words, with reduced mask, the reconstruction will converge fast and user selected region will be enhanced more. FIG. 9B further elaborates operations 901 to 904 in an example implementation. Overall, user interest is captured via passive feedback. Based on that interest, the mask is updated using those ROI coordinates. The reconstruction is executed again to enhance the scene. Accordingly, the user is rendered an updated preview.

Figure 9C:
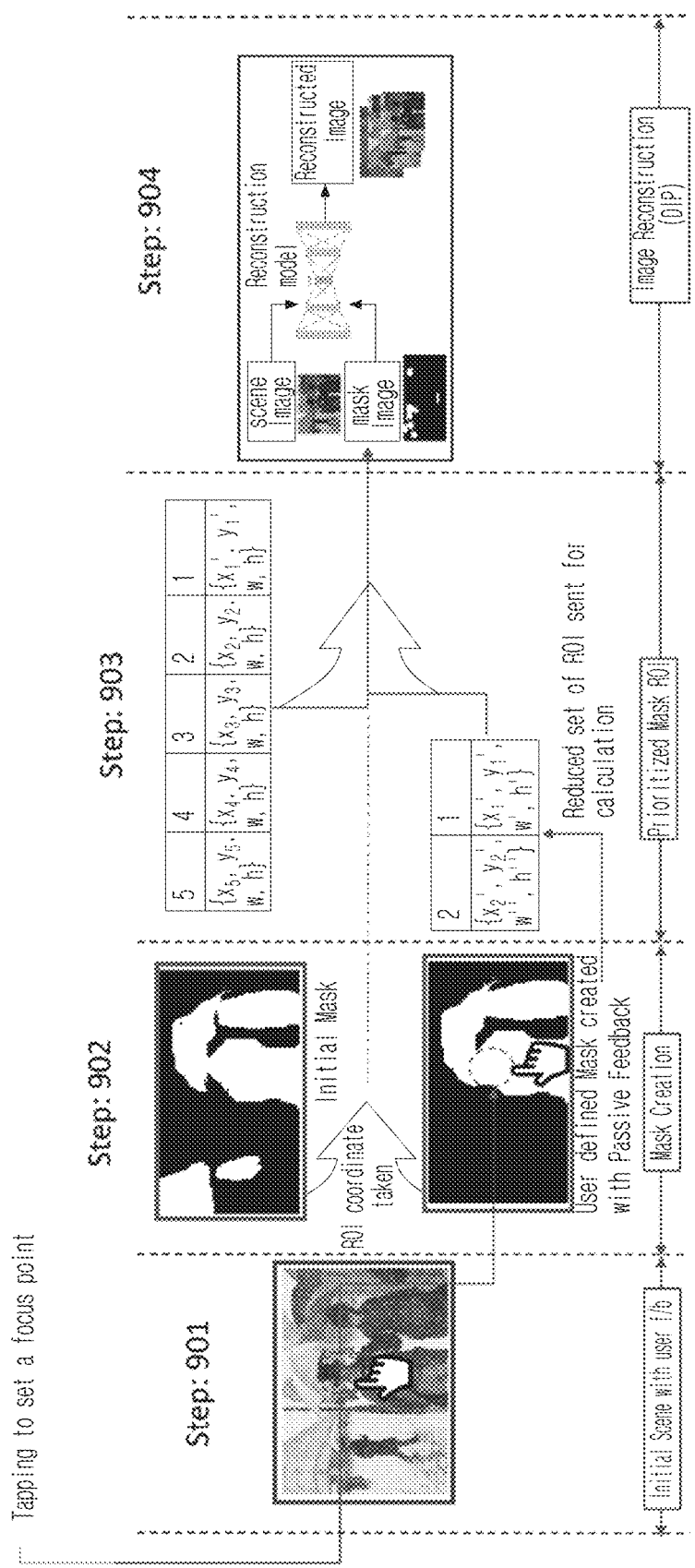
Figure 9D:
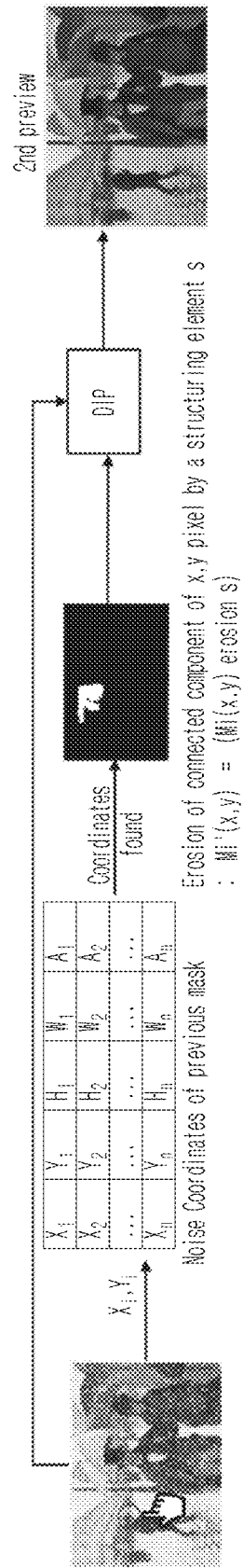
Figure 9E:
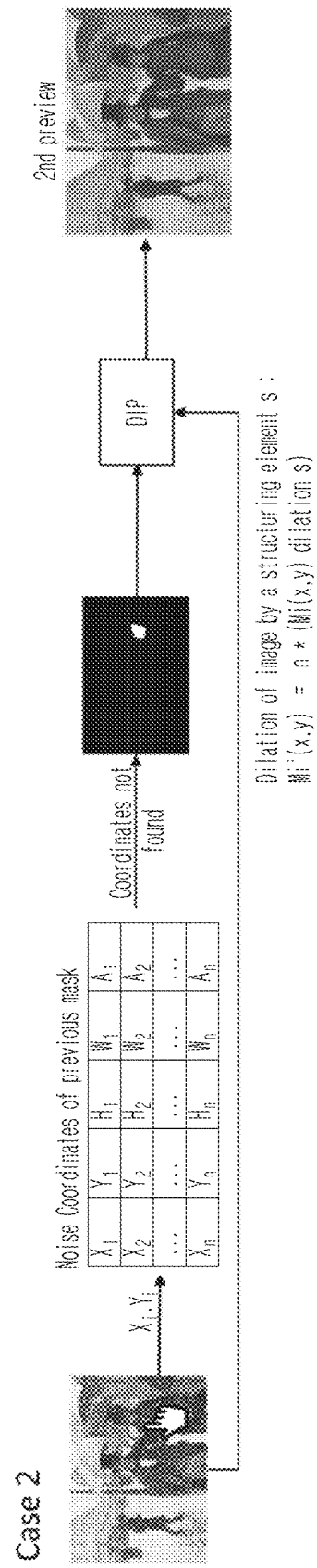

FIG. 9C further elaborates detailed mask creation method for user touch feedback based on operations 902 and 903. As a part of operations 902 and 903, the user touches some specific area of screen, coordinates of those area (x, y) for touch event will be extracted and searched. Based thereupon, there may be two cases as further depicted in FIG. 9D FIGS. 9D and 9E depict the two case scenarios as provided in FIG. 9C.

As a part of Case 1, the value of coordinate of user defined mask is present in previous Initial Mask: The user defined mask is generated with the coordinates (x,y) found in Initial Mask. (x,y) and pixels of its connected components in the previously labeled image followed by erosion operation that will be considered in noisy space and rest all as clean part of image.

Erosion of connected component of x,y pixel by a structuring element s:

$$Mi'(x,y) = (Mi(x,y) \text{erosion } s)$$

wherein, Mi(x,y): initial/previous mask and Mi'(x,y): current updated mask

As a part of Case 2, the value of coordinate of user defined mask is not present in Initial Mask: New mask or the user defined mask is generated and dilation is applied n times, wherein n depends on type of contamination. For example, for given case of water droplet n=2. Those values will be highlighted as noise and rest all as a clean part of image.

$$\text{Dilation of image by a structuring element } s: Mi'(x, y) = n^*(Mi(x,y) \text{dilation } s)$$

Overall, the user defined mask helps in better noise localization as it captures the user perception which difficult to be understood by system. The user perception is taken into account and improved quality of image is shown as preview. Less area of mask helps in reducing the iterations required to converge the model and reconstruction becomes faster.

Normally, initial mask contains scattered contamination, for example 80 spots. Few spots are large and whereas few are small in area. Based on the present subject matter, DIP keeps cleaning all spots continuously till a huge number of iterations using initial mask. Initial mask covers overall contamination of the scene, which will be large area. It takes more iteration to clear and present 1St preview. As soon as user click capture button, the presented preview will be saved.

The present subject matter strikes an optimization by partially using the initial mask and partially the user-defined mask. As stated aforesaid, initial mask contains scattered contamination, DIP starts reconstruction of the image and user feedback is provided. At about half of the iteration with respect to initial mask, some spots (for example 50%) get cleared by initial mask processing. User defined mask is generated as per user perception and corresponds to a smaller or larger area.

Now, DIP is guided by user defined mask and reconstructs the areas as per user's perception. For small area, less iterations and clear image can be still achieved. Improved quality image comes as 2Nd preview, considering user perception. Accordingly, the lens contamination problem is localized, processing specific areas takes less time and according to user personal choice.

Figure 10A:
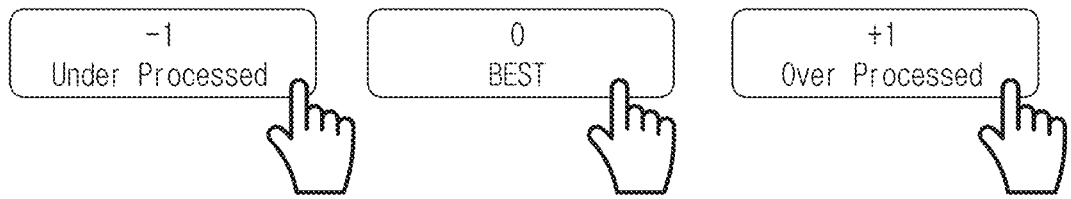
FIGS. 10A and 10B illustrate a flow chart for implementation of the active user input, in accordance with an embodiment
Figure 10B:
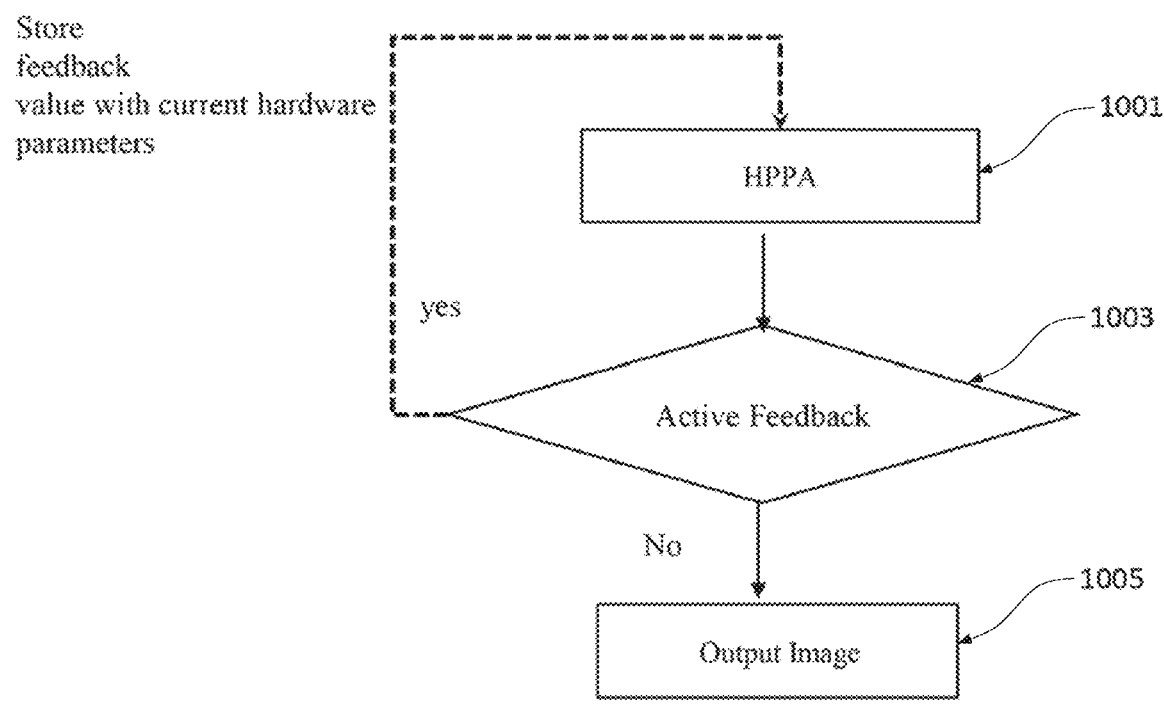

FIGS. 10A and 10B illustrate a flow chart for implementation of the active user input, in accordance with the embodiment of the present disclosure. In an implementation, the active user input is defined in the FIG. 10A which is decided based on stopping criteria or user contact on the first preview image. The user contact can be categorized as under processed −1, best 0, over processed+1. Here RW is active user input which is {−1, 0, 1}. This will be stored and fed back to the network. This feedback will be useful for more personalized output for future capture of image. In an implementation the HPPA will be updated based on the active user input as shown in FIG. 10B.

Figure 11:
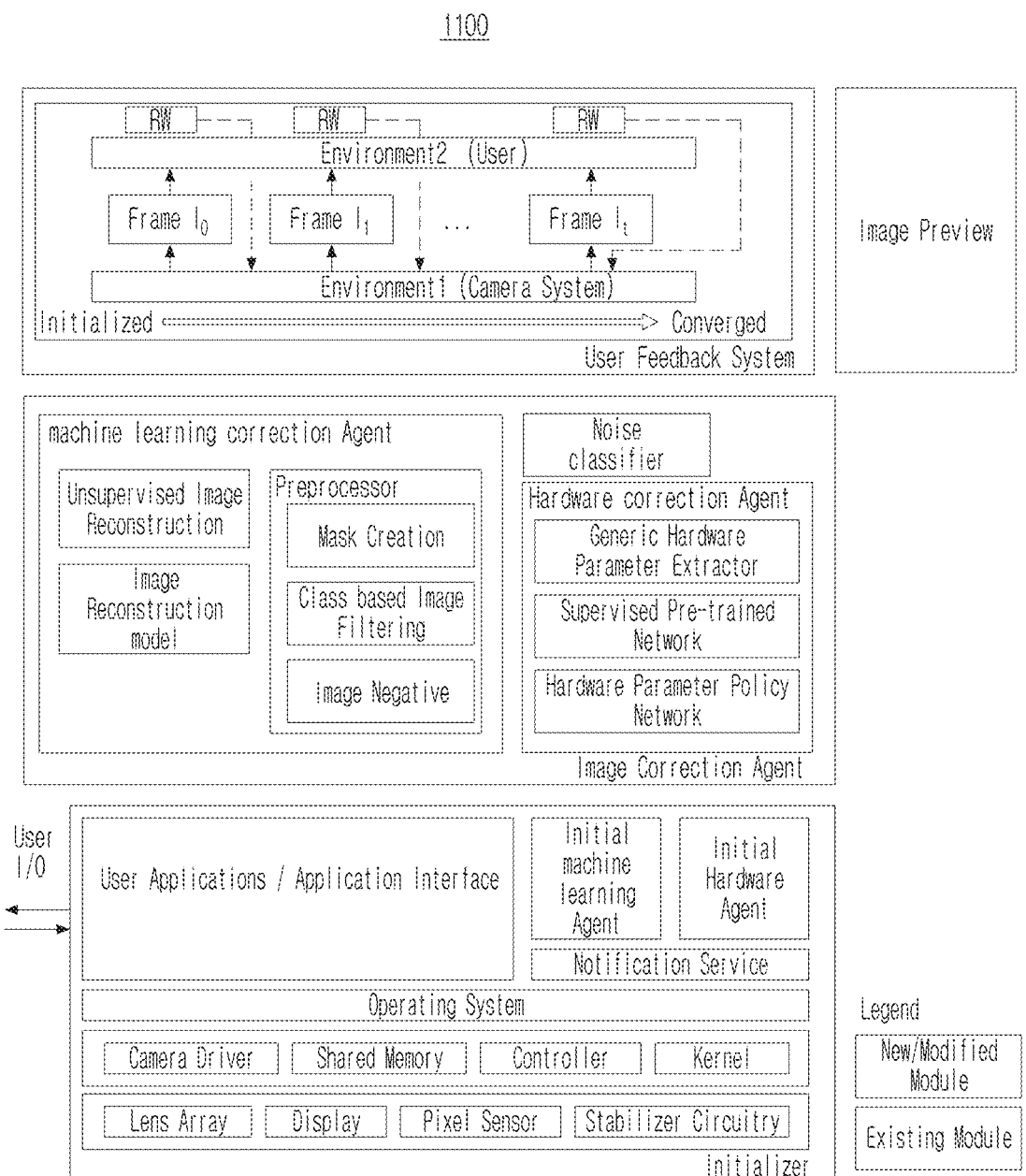
FIG. 11 illustrates an overall system architecture comprising various components as described in FIGS. 5A to 10B, in accordance with an embodiment.

FIG. 11 illustrates an overall system architecture comprising various components as described in FIGS. 5A-10B. An implementation details of various components are explained above, therefore of the sake of brevity the explanation of the same have been omitted here.

Figure 12:
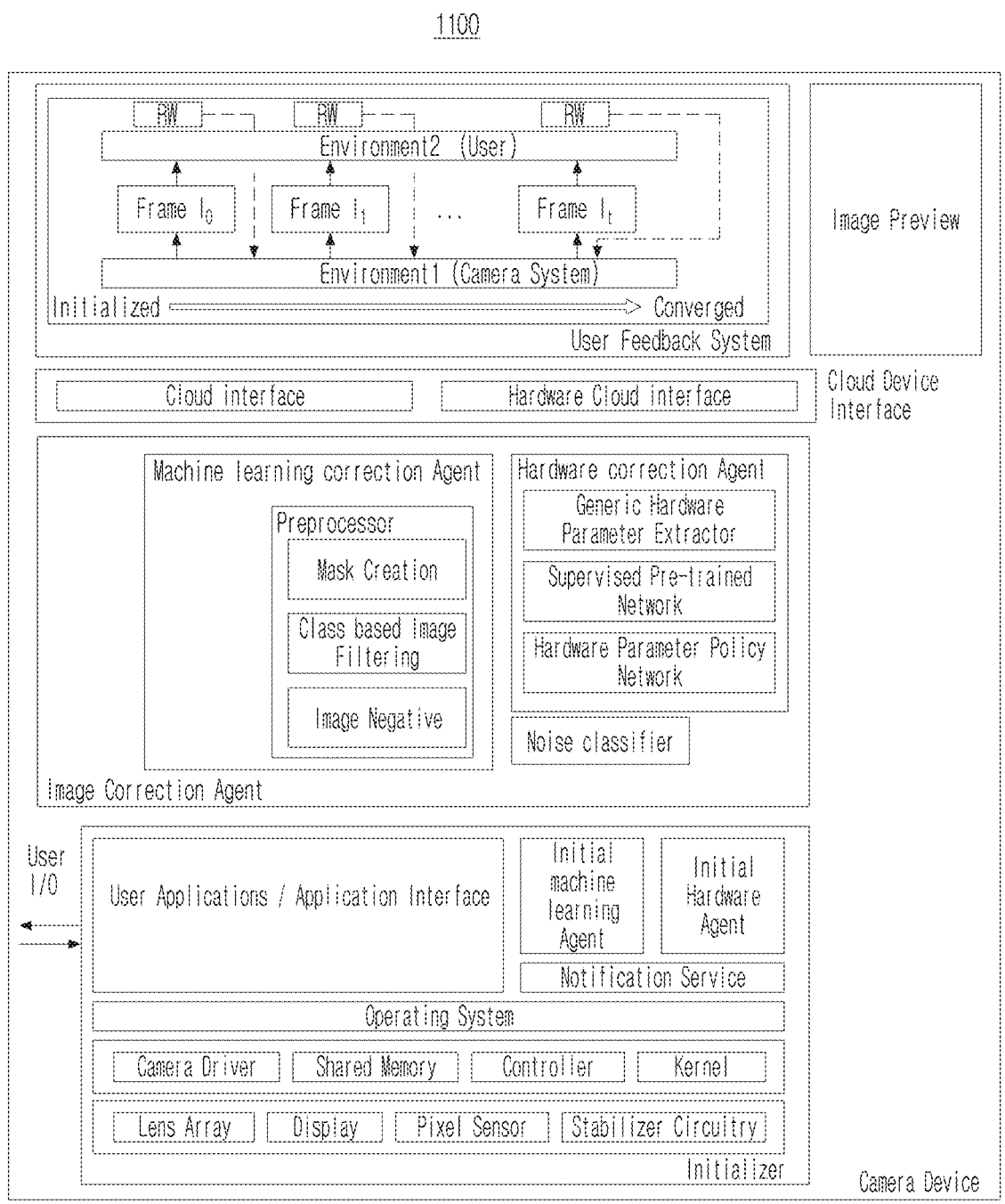
FIG. 12 illustrates an overall system architecture in a cloud server architecture, in accordance with an embodiment.

FIG. 12 illustrates an overall system architecture in a cloud server architecture, according to an embodiment of the present disclosure. Accordingly, the system 1100 may be configured to include in a cloud client server architecture. In an implementation, a Cloud Device Interface may reside on device or a system 1100 that send requests to and receive data from cloud server with below two functionality. As an example, the cloud interface is an interface to call machine learning criteria reconstruction module and hardware cloud interface is an interface to send/receive predicted hardware parameter. This mechanism enables initial parameter sharing among users to improve the convergence time of network.

Now, various uses cases for implementing mechanism as disclosed above will be disclosed.

As an example, when a camera lens is affected by different types of contamination, the various type of contamination gets detected and then corrected in real time image preview provided to user. Thus, different contamination types on lens can be detected and corrected with the proposed method. No re-clicks required. The user can have a perfect shot by seeing real time preview picture. No 3Rd party tool required, the user can get corrected image in real time. Further, no poor-quality image is captured. With best hardware and machine learning criteria processing good quality image can be achieved. Furthermore, time efficient, "On Device" real time image can be achieved by user. Furthermore, the disclosure results in better output image and may be used with all the smart camera devices or any other services alike. This association will expand the scope of disclosure to different range of products.

Figure 13:
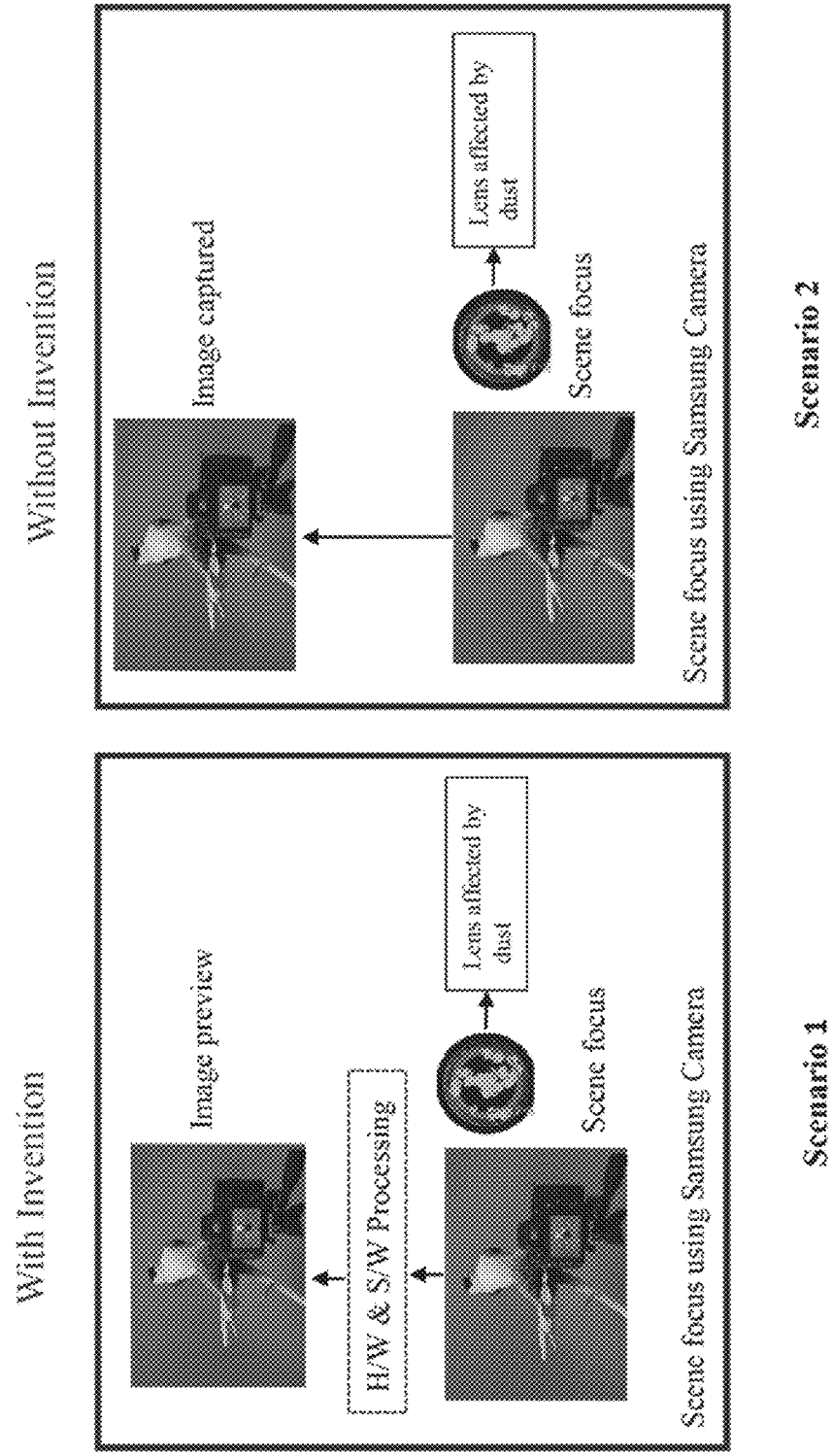
FIG. 13 illustrates an exemplary use case, according to an embodiment.

FIG. 13 illustrates an exemplary scenario based on the present mechanism. According to the scene 1. User focus on scene with lens contaminated by dust. The hardware settings for users will be set for such set of contamination and software processing starts with unsupervised learning model as explained above. Thus, the output from both h/w and s/w model will be processed and a clear quality image preview will be available to user. The same may be implemented while performing video calling in a smart TV or viewing an image in smart AR glasses. On the other hand, according to the scene 2, when the user focus on scene with lens contaminated by dust, conventional system take the focused scene, process it and generate digital image that have traces of dust in it. Thus, the quality of the image is compromised.

Figure 14:
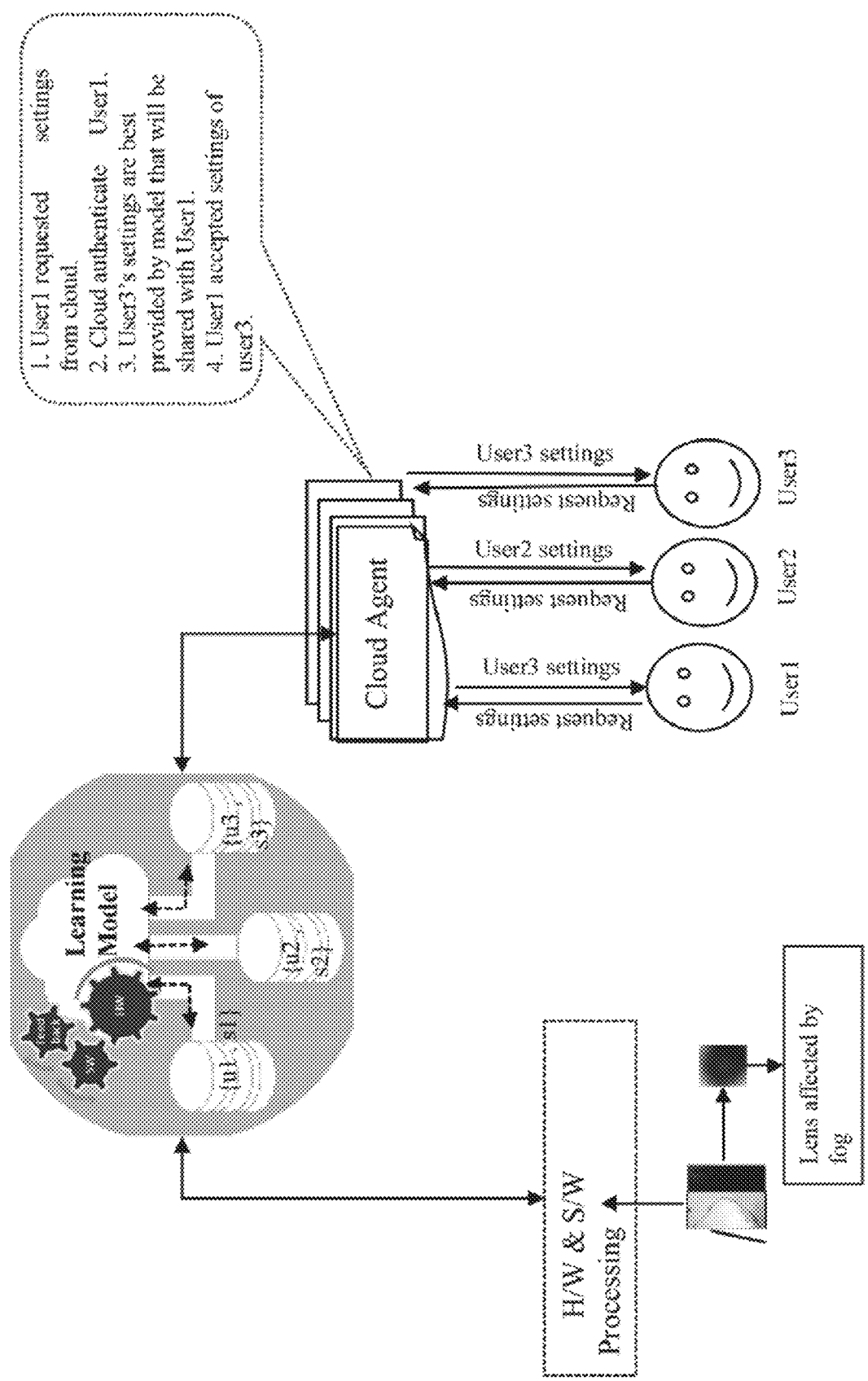
FIG. 14 illustrates an exemplary use case, according to an embodiment.

FIG. 14 illustrates another exemplary scenario based on the present mechanism. In the present use case, cloud will be used for saving user's preferred dynamic settings. To compensate lens contamination, cloud provide best settings to every requested user that improves overall processing mechanism on device by learning from feedback provided by every user. As a further example, the cloud can be used for saving user's preferred dynamic settings. To compensate lens contamination, cloud provide best settings to every requested user that improves overall processing mechanism on device by learning from feedback provided by every user. Thus, the user gets dynamic settings when requested settings from Cloud server. It provides best processing mechanism that gets refined by time. Further, with the inclusion of cloud and possibility to share hardware and machine learning criteria settings on other device provides fast computing. As an example, devices with least configuration can also use those settings and perform faster computation.

Figure 15:
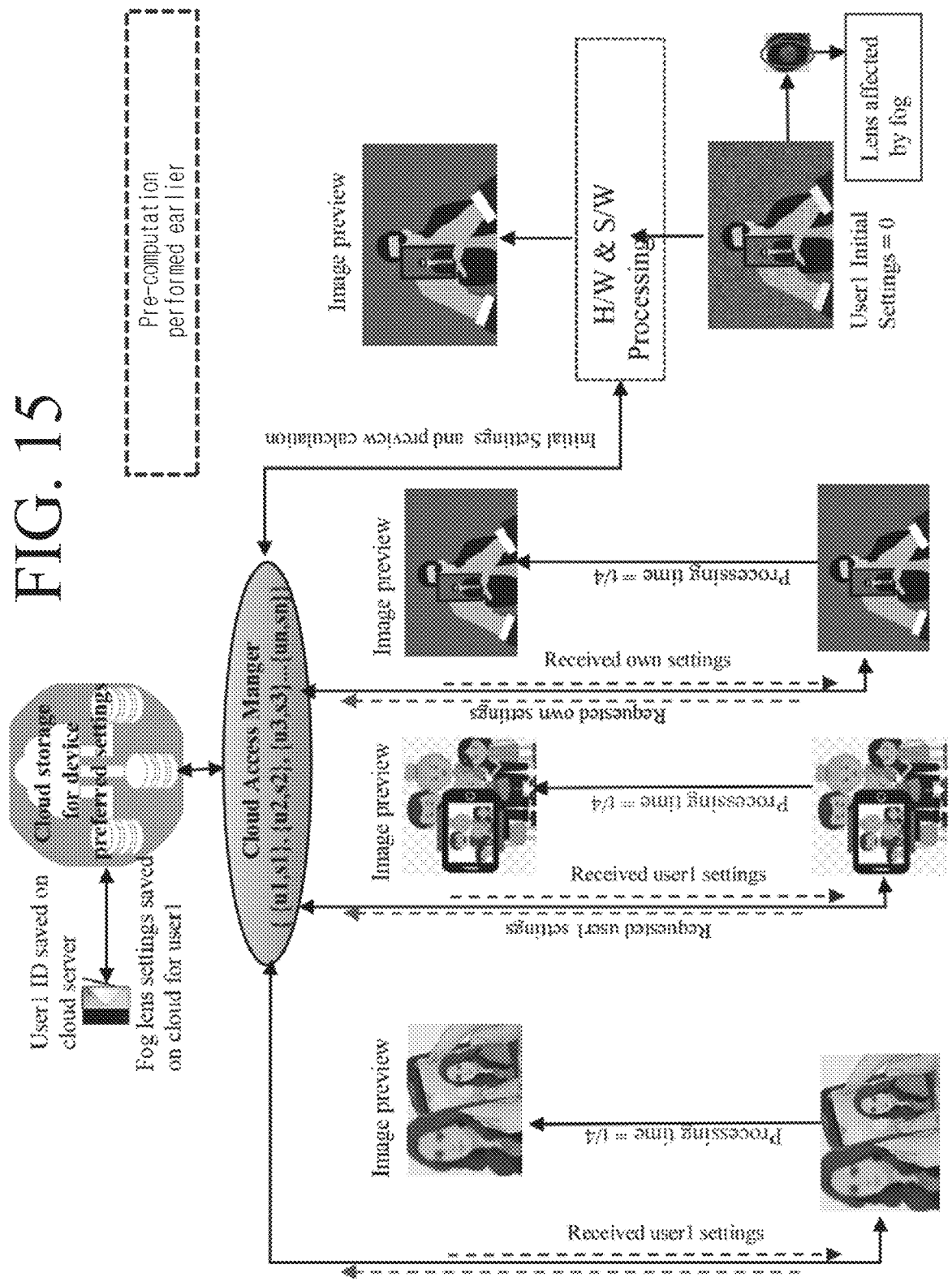
FIG. 15 illustrates an exemplary use case, according to an embodiment.

FIG. 15 illustrates yet another exemplary scenario based on the present mechanism. In the present example, multiple users may access precomputed M/L processing iteration from a device 1 to multiple devices upon request of such setting information. Then in that case the precomputed M/L processing will become initial setting for the requested device. Such setting can be store in a cloud manager, thus may provide faster functioning on user device. As an example, user1 registers its ID for authentication and uploaded settings on cloud. Now when, user1, user2 and user3 requests settings on his/her device then cloud authenticates user ID through user1 ID and sent a pre-computed ML learning criteria processing iteration to the requested device that will become initial setting on device of user1, user2 and user3. Thus, resulting in a faster computation and less time than user start from initial processing. The existing user previous feedback system guarantees better results every time to new users as well. Further, by getting pre computed steps data processing, space can be saved by sharing cloud space by different users.

In further example, consider a picture capturing scenario in a smart phone in rainy weather with camera lens affected with water drops. With the implementation of the present disclosed mechanism a clear preview captured image can be achieved, when the user focuses on scene is contaminated may be due to water drops.

Figure 16:
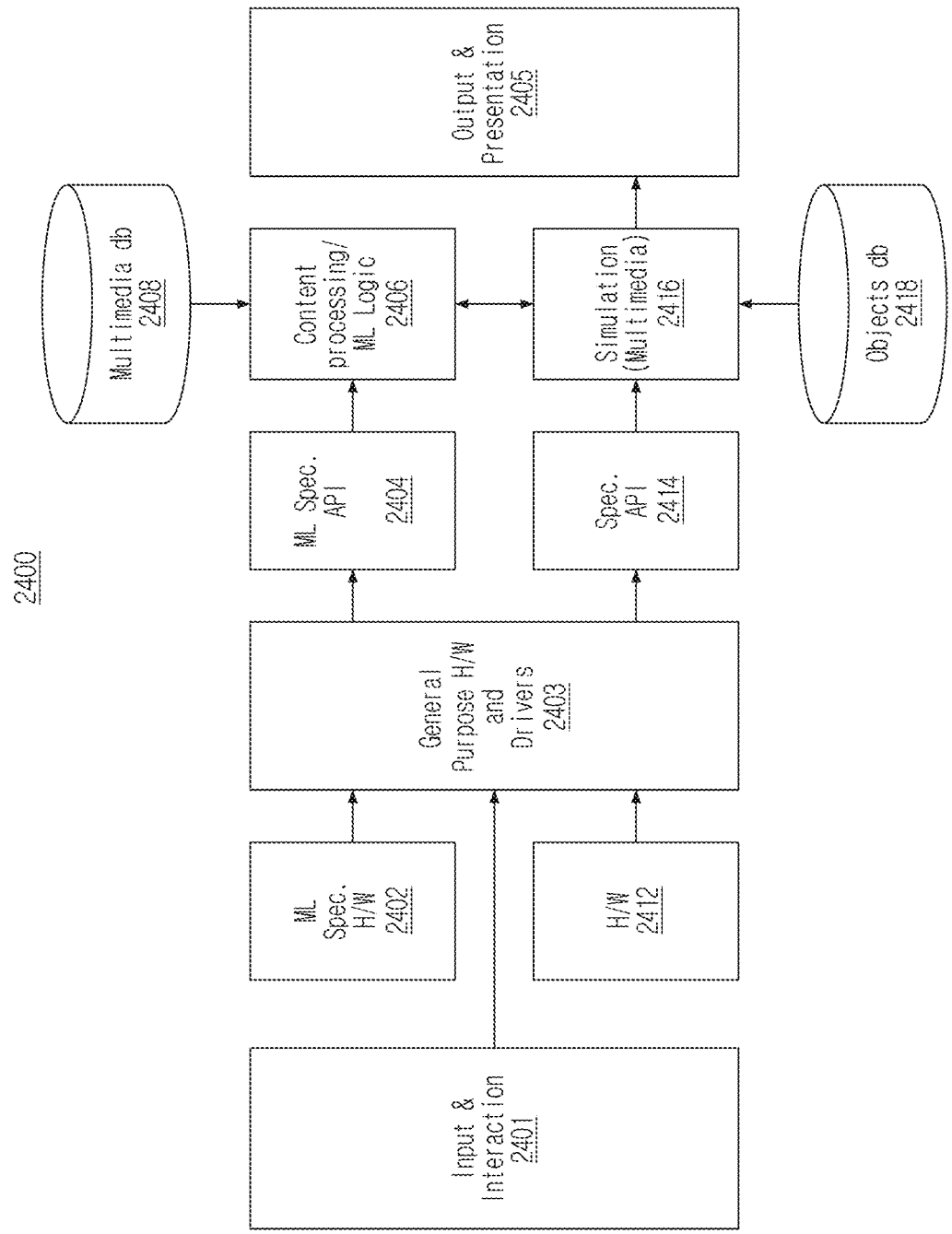
FIG. 16 illustrates another system architecture, in accordance with an embodiment.

FIG. 16 illustrates a representative architecture 2400 to provide tools and development environment described herein for a technical-realization of the implementation server, controller and nodes in the mesh network through a computing device. FIG. 16 is merely a non-limiting example, and it will be appreciated that many other architectures may be implemented to facilitate the functionality described herein. The architecture may be executing on hardware such as a computing machine 2400 of FIG. 16 that includes, among other things, processors, memory, and various application-specific hardware components.

The architecture 2400 may include an operating-system, libraries, frameworks or middleware. The operating system may manage hardware resources and provide common services. The operating system may include, for example, a kernel, services, and drivers defining a hardware interface layer. The drivers may be responsible for controlling or interfacing with the underlying hardware. For instance, the drivers may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

A hardware interface layer includes libraries which may include system libraries such as file-system (e.g., C standard library) that may provide functions such as memory allocation functions, string manipulation functions, mathematic functions, and the like. In addition, the libraries may include API libraries such as audio-visual media libraries (e.g., multimedia data libraries to support presentation and manipulation of various media format such as MPEG4, H.264, MP3, AAC, AMR, JPG, PNG), database libraries (e.g., SQLite that may provide various relational database functions), web libraries (e.g. WebKit that may provide web browsing functionality), and the like.

A middleware may provide a higher-level common infrastructure such as various graphic user interface (GUI) functions, high-level resource management, high-level location services, and so forth. The middleware may provide a broad spectrum of other APIs that may be utilized by the applications or other software components/modules, some of which may be specific to a particular operating system or platform.

The term "module" used in this disclosure may refer to a certain unit that includes one of hardware, software and firmware or any combination thereof. The module may be interchangeably used with unit, logic, logical block, component, or circuit, for example. The module may be the minimum unit, or part thereof, which performs one or more particular functions. The module may be formed mechanically or electronically. For example, the module disclosed herein may include at least one of ASIC (Application-Specific Integrated Circuit) chip, FPGAs (Field-Programmable Gate Arrays), and programmable-logic device, which have been known or are to be developed.

Further, the architecture 2400 depicts an aggregation of audio/video processing device based mechanisms and ML/NLP based mechanism in accordance with an embodiment of the present subject matter. A user-interface defined as input and interaction 2401 refers to overall input. It can include one or more of the following—touch screen, microphone, camera etc. A first hardware module 2402 depicts specialized hardware for ML/NLP based mechanisms. In an example, the first hardware module 2402 comprises one or more of neural processors, FPGA, DSP, GPU etc.

A second hardware module 2412 depicts specialized hardware for executing the data splitting and transfer. ML/NLP based frameworks and APIs 2404 correspond to the hardware interface layer for executing the ML/NLP logic 2406 based on the underlying hardware. In an example, the frameworks may be one or more or the following—Tensorflow, Café, NLTK, GenSim, ARM Compute etc. Simulation frameworks and APIs 2414 may include one or more of—Audio Core, Audio Kit, Unity, Unreal etc.

A database 2408 depicts a pre-trained database. The database 2408 may be remotely accessible through cloud by the ML/NLP logic 2406. In other example, the database 2408 may partly reside on cloud and partly on-device based on usage statistics.

Another database 2418 refers the memory. The database 2418 may be remotely accessible through cloud. In other example, the database 2418 may partly reside on the cloud and partly on-device based on usage statistics.

A rendering module 2405 is provided for rendering audio output and trigger further utility operations. The rendering module 2405 may be manifested as a display, touch screen, monitor, speaker, projection screen, etc.

A general-purpose hardware and driver module 2403 corresponds to the computing device 2500 as referred in FIG. 16 and instantiates drivers for the general purpose hardware units as well as the application-specific units (2402, 2412).

In an example, the ML mechanism underlying the present architecture 2400 may be remotely accessible and cloud-based, thereby being remotely accessible through a network connection. An audio/video processing device may be configured for remotely accessing the NLP/ML modules and simulation modules may comprise skeleton elements such as a microphone, a camera a screen/monitor, a speaker etc.

Further, at-least one of the plurality of modules of mesh network may be implemented through AI based on an ML/NLP logic 2406. A function associated with AI may be performed through the non-volatile memory, the volatile memory, and the processor constituting the first hardware module 2402 i.e. specialized hardware for ML/NLP based mechanisms. The processor may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The aforesaid processors collectively correspond to the processor 2502 of FIG. 16.

The one or a plurality of processors control the processing of the input data in accordance with a predefined operating rule or artificial intelligence (AI) model stored in the non-volatile memory and the volatile memory. The predefined operating rule or artificial intelligence model is provided through training or learning.

Here, being provided through learning means that, by applying a learning logic/technique to a plurality of learning data, a predefined operating rule or AI model of the desired characteristic is made. "Obtained by training" means that a predefined operation rule or artificial intelligence model configured to perform a desired feature (or purpose) is obtained by training a basic artificial intelligence model with multiple pieces of training data by a training technique. The learning may be performed in a device (i.e. the architecture 2400 or the device 2500) itself in which AI according to an embodiment is performed, and/or may be implemented through a separate server/system."

The AI model may consist of a plurality of neural network layers. Each layer has a plurality of weight values, and performs a neural network layer operation through calculation between a result of computation of a previous-layer and an operation of a plurality of weights. Examples of neural-networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The ML/NLP logic 2406 is a method for training a predetermined target device (for example, a robot) using a plurality of learning data to cause, allow, or control the target device to make a determination or prediction. Examples of learning techniques include, but are not limited to, supervised learning, unsupervised learning, semi-supervised learning, or reinforcement learning.

Figure 17:
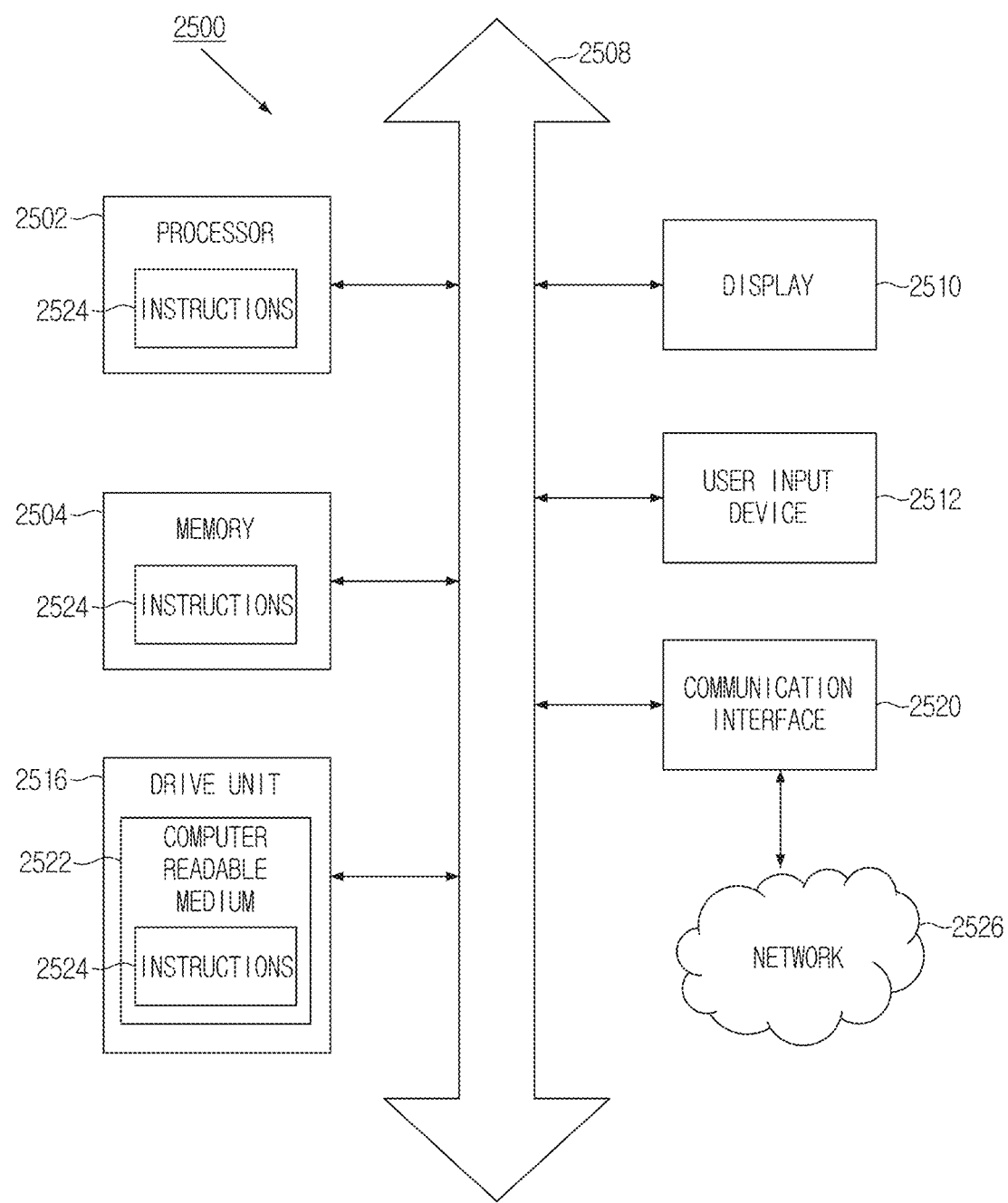
FIG. 17 shows yet another exemplary implementation in accordance with an embodiment.

FIG. 17 shows yet another exemplary implementation in accordance with the embodiment of the disclosure, and yet another typical hardware configuration of the system 2400 in the form of a computer system 2500. The computer system 2500 can include a set of instructions that can be executed to cause the computer system 2500 to perform any one or more of the methods disclosed. The computer system 2500 may operate as a standalone device or may be connected, e.g., using a network, to other computer systems or peripheral devices.

In a networked deployment, the computer system 2500 may operate in the capacity of a server or as a client user computer in a server-client user network environment, or as a peer computer system in a peer-to-peer (or distributed) network environment. The computer system 2500 can also be implemented as or incorporated across various devices, such as a personal computer (PC), a tablet PC, a personal digital assistant (PDA), a mobile device, a palmtop computer, a laptop computer, a desktop computer, a communications device, a wireless telephone, a land-line telephone, a web appliance, a network router, switch or bridge, or any other machine capable of executing a set of instructions (sequential or otherwise) that specify actions to be taken by that machine. Further, while a single computer system 2500 is illustrated, the term "system" shall also be taken to include any collection of systems or sub-systems that individually or jointly execute a set, or multiple sets, of instructions to perform one or more computer functions.

The computer system 2500 may include a processor 2502 e.g., a central processing unit (CPU), a graphics processing unit (GPU), or both. The processor 2502 may be a component in a variety of systems. For example, the processor 2502 may be part of a standard personal computer or a workstation. The processor 2502 may be one or more general processors, digital signal processors, application-specific integrated circuits, field-programmable gate arrays, servers, networks, digital circuits, analog circuits, combinations thereof, or other now known or later developed devices for analyzing and processing data. The processor 2502 may implement a software program, such as code generated manually (i.e., programmed).

The computer system 2500 may include a memory 2504, such as a memory 2504 that can communicate via a bus 2508. The memory 2504 may include, but is not limited to computer-readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, memory 2504 includes a cache or random access memory for the processor 2502. In alternative examples, the memory 2504 is separate from the processor 2502, such as a cache memory of a processor, the system memory, or other memory. The memory 2504 may be an external storage device or database for storing data. The memory 2504 is operable to store instructions executable by the processor 2502. The functions, acts or tasks illustrated in the FIGS. or described may be performed by the programmed processor 2502 for executing the instructions stored in the memory 2504. The functions, acts or tasks are independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing and the like.

As shown, the computer system 2500 may or may not further include a display unit 2510, such as a liquid crystal display (LCD), an organic light-emitting diode (OLED), a flat panel display, a solid-state display, a cathode ray tube (CRT), a projector, a printer or other now known or later developed display device for outputting determined information. The display 2510 may act as an interface for the user to see the functioning of the processor 2502, or specifically as an interface with the software stored in the memory 2504 or the drive unit 2516.

Additionally, the computer system 2500 may include an input device 2512 configured to allow a user to interact with any of the components of system 2500. The computer system 2500 may also include a disk or optical drive unit 2516. The disk drive unit 2516 may include a computer-readable medium 2522 in which one or more sets of instructions 2524, e.g. software, can be embedded. Further, the instructions 2524 may embody one or more of the methods or logic as described. In a particular example, the instructions 2524 may reside completely, or at least partially, within the memory 2504 or within the processor 2502 during execution by the computer system 2500.

The present disclosure contemplates a computer-readable medium that includes instructions 2524 or receives and executes instructions 2524 responsive to a propagated signal so that a device connected to a network 2526 can communicate voice, video, audio, images, or any other data over the network 2526. Further, the instructions 2524 may be transmitted or received over the network 2526 via a communication port or interface 2520 or using a bus 2508. The communication port or interface 2520 may be a part of the processor 2502 or maybe a separate component. The communication port 2520 may be created in software or maybe a physical connection in hardware. The communication port 2520 may be configured to connect with a network 2526, external media, the display 2510, or any other components in system 2500, or combinations thereof. The connection with the network 2526 may be a physical connection, such as a wired Ethernet connection or may be established wirelessly as discussed later. Likewise, the additional connections with other components of the system 2500 may be physical or may be established wirelessly. The network 2526 may alternatively be directly connected to the bus 2508.

The network 2526 may include wired networks, wireless networks, Ethernet AVB networks, or combinations thereof. The wireless network may be a cellular telephone network, an 802.11, 802.16, 802.20, 802.1Q or WiMax network. Further, the network 826 may be a public network, such as the Internet, a private network, such as an intranet, or combinations thereof, and may utilize a variety of networking protocols now available or later developed including, but not limited to TCP/IP based networking protocols. The system is not limited to operation with any particular standards and protocols. For example, standards for Internet and other packet-switched network transmissions (e.g., TCP/IP, UDP/IP, HTML, and HTTP) may be used.

The above-described embodiments may be implemented as programs executable on a computer, and be implemented by a general-purpose digital computer for operating the programs by using a non-transitory computer-readable medium. Data structures used in the above-described embodiments may be recorded on the computer-readable medium via a variety of means. The above-described embodiments of the disclosure may be implemented in the form of a non-transitory computer-readable recording medium including instructions executable by the computer, such as a program module executed by the computer. For example, methods implemented by software modules or algorithms may be stored in a computer-readable medium as computer-readable codes or program commands executable by the computer.

The non-transitory computer-readable recording medium may be any recording medium that are accessible by the computer, and examples thereof may include both volatile and non-volatile media and both detachable and non-detachable media. Examples of the computer-readable medium may include magnetic storage media (e.g., ROM, floppy disks, and hard disks) and optical recording media (e.g., compact disc-ROM (CD-ROM) and digital versatile discs (DVDs)), but are not limited thereto. Furthermore, the computer-readable recording medium may include a computer storage medium and a communication medium. A plurality of computer-readable recording media may be distributed over network-coupled computer systems, and data, e.g., program instructions and codes, stored in the distributed recording media may be executed by at least one computer.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, those skilled in the art will recognize that the embodiments herein may be practiced with modification within the scope of the disclosure as described herein.

While specific language has been used to describe the disclosure, any limitations arising on account of the same are not intended. As would be apparent to a person in the art, various working modifications may be made to the method in order to implement the inventive concept as taught herein.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein.

Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A method for image capture, the method comprising:
classifying a noise associated with a lens of an imaging device during image capture;
preprocessing a captured image based on the classified noise to determine an initial region of interest (ROI) with respect to the captured image, the preprocessing comprising determining a negative-image of the captured image and applying at least one noise filter to the negative-image, the at least one noise filter corresponding to the classified noise;
generating a first processed image by inputting the initial ROI and the captured image to a deep learning network, the first processed image corresponding to a first reconstruction of the captured image;
rendering a first preview corresponding to the first processed image;

receiving a passive user input corresponding to a portion of the first preview;

determining a second ROI with respect to the captured image based on the passive user input and the classified noise, the second ROI positioned at least partially within the initial ROI;

generating a second processed image by inputting the second ROI and the captured image to the deep learning network, the second processed image corresponding to a second reconstruction of the captured image; and generating a user-personalization based noise-corrected final image based on the second processed image.

2. The method of claim 1, wherein the classifying the noise associated with the lens of the imaging device comprises:

capturing a live-view image as the captured image;

calculating at least one metric based on the live-view image;

receiving a notification that indicates a visual artifact in the live-view image based on the calculated at least one metric;

determining if a lens of the imaging device is externally contaminated based on the notification; and classifying the external lens contamination as one or more type of noise through a convolution neural network (CNN) based noise classifier.

3. The method of claim 2, wherein preprocessing of the captured image comprises:

computing the negative-image based on a color space to highlight a noise affected region in the captured image;

applying one or more noise localization mechanism to the negative-image based on selection of the at least one noise filter in turn based on the classified noise; and determining the initial ROI for the captured images-image based on the applying of the applied one or more noise localization mechanisms.

4. The method of claim 3, wherein the at least one noise filter applied to the negative-image comprises at least one of:

a fog filter comprising a linear transformation criteria based at least in part on a brightness, contrast and luminance associated with the negative-image; and a water or dust filter comprising an edge detection criteria based on one or more medians of the negative-image, a morphological closing process comprising a plurality of shape expansion operations and shape reduction operations, and outlier-removal.

5. The method of claim 1, wherein the preprocessing the captured image comprises:

extracting, via a plurality of hardware parameter prediction blocks, at least one vector for the captured image based on the classified noise, the at least one vector comprising at least one of a significant component vector and a hardware parameter vector, and the plurality of hardware parameter prediction blocks corresponding to pre-trained networks configured to correct an image affected by at least one of dust, fog, and water droplets; and predicting, via the plurality of hardware parameter prediction blocks, a first plurality of commensurate hardware parameters based on the at least one vector.

6. The method of claim 5, wherein the rendering the first preview comprises:

processing the first processed image based on the predicted first plurality of commensurate hardware parameters.

7. The method of claim 1, wherein the determining the second ROI with respect to the captured image comprises:

determining location coordinates with respect to the first processed image, based on the portion of the first preview corresponding to the passive user input, by sensing at least one of a contact with a region of a display on which the first preview is displayed, the contacted region of the display being proximate to the portion of the first preview, a gesture corresponding to the portion of the first preview, and an utterance corresponding to the portion of the first preview.

8. The method of claim 7, further comprising:

based on ascertaining that the location coordinates correspond to a location inside the initial ROI, applying a shape-reduction based operation against the location coordinates to determine the second ROI with respect to the captured image, the second ROI corresponding to a smaller area than the initial ROI.

9. The method of claim 8, further comprising:

based on ascertaining that the location coordinates correspond to a location outside the initial ROI, applying a shape-expansion based operation in accordance with the classified noise against the location coordinates to determine the second ROI with respect to the captured image.

10. The method of claim 5, further comprising:

modifying the at least one vector based on location coordinates of the portion of the first preview;

predicting, via the plurality of hardware parameter prediction blocks, a second plurality of commensurate hardware parameters based on the modified at least one vector; and rendering a second preview corresponding to the second processed image based on the predicted second plurality of commensurate hardware parameters.

11. The method of claim 10, wherein the rendering the second preview comprises:

applying the predicted second plurality of commensurate hardware parameters to the second processed image; and generating the user-personalization based noise-corrected final image, based on the processed second processed image.

12. The method of claim 1, wherein the passive user input corresponding to the portion of the first preview comprises at least one of a touch for focus setting and eye gaze information used to determine the second ROI with respect to the captured image.

13. The method of claim 1, wherein the preprocessing of the captured image and the generating of the first processed image correspond to a predetermined criteria.

14. The method of claim 1, wherein the preprocessing of the captured image and the generating of the first processed image correspond to a dynamically determined criteria, the dynamically determined criteria comprising a real-time determination of at least one of a type of a noise-filter for localizing the classified noise, a type of deep learning network, and a type of a hardware parameter applied to the first processed image.

15. An image-capturing device comprising:

a noise-classifier module configured to classify a noise associated with a lens of an imaging device during image capture;

a first image processing module configured to preprocess a captured image based on the classified noise to determine an initial region of interest (ROI) with respect to the captured image based on a negative-image of the captured image and at least one noise filter applied to the negative-image, the at least one noise filter corresponding to the classified noise;

a first image reconstruction module configured to at least partially reconstruct the captured image by generating a first processed image based on inputting the initial ROI and the captured image to a deep learning network;

a rendering module configured to render a first preview corresponding to the first processed image;

a user feedback module configured to receive a passive user input corresponding to a portion of the first preview;

a second image processing module configured to determine an additional a second ROI with respect to the captured image based on the passive user input and the classified noise, the second ROI positioned at least partially within the initial ROI;

a second image reconstruction module configured to reconstruct the captured image by generating a second processed image based on inputting the second ROI and the captured image to the deep learning network; and an output generating module configured to generate a user-personalized and noise-corrected final image.

16. The image-capturing device of claim 15, further comprising a hardware correction module configured to:
extract at least one vector for the captured image based on the classified noise, the at least one vector comprising at least one of a significant component vector and a hardware parameter vector; and
predict a first plurality of commensurate hardware parameters based on the at least one vector.

17. The image-capturing device of claim 16, wherein the hardware correction module is further configured to:
modify the at least one vector based on location coordinates of the portion of the first preview; and
predict a second plurality of commensurate hardware parameters based on the modified at least one vector.

18. The image-capturing device of claim 17, wherein the rendering module is further configured to:
apply the predicted second plurality of commensurate hardware parameters to the second processed image to render a second preview corresponding to the second processed image; and
generate the user-personalization based noise-corrected final image based on the processed second processed image.

19. The image-capturing device of claim 15, wherein the first image processing module is configured to apply the at least one noise filter to the negative-image based on a dynamically determined criteria comprising a real-time determination of at least one of a type of a noise-filter for localizing the classified noise, a type of deep learning network, and a type of a hardware parameter applied to the first processed image.

20. A non-transitory computer readable medium for storing computer readable program code or instructions which are executable by a processor to perform a method for image capture, the method comprising:
classifying a noise associated with a lens of an imaging device during image capture;
preprocessing a captured image based on the classified noise to determine an initial region of interest (ROI) with respect to the captured image based on a negative-image of the captured image and at least one noise filter applied to the negative-image, the at least one noise filter based on the classified noise;
generating a first processed image by inputting the initial ROI and the captured image to a deep learning network, the first processed image corresponding to a first reconstruction of the captured image;
rendering a first preview corresponding to the first processed image;
receiving a passive user input corresponding to a portion of the first preview;
determining a second ROI with respect to the captured image based on the passive user input and the classified noise, the second ROI positioned at least partially within the initial ROI;
generating a second processed image by inputting the second ROI and the captured image to the deep learning network, the second processed image corresponding to a second reconstruction of the captured image; and
generating a user-personalization based noise-corrected final image based on the second processed image.

21. The method of claim 1, wherein the initial ROI is generated based on the at least one noise filter applied to the negative-image.

22. The method of claim 1, wherein the first processed image is generated by obtaining a first mask based on the initial ROI.

23. The method of claim 22, wherein the second processed image is generated by obtaining a second mask based on the second ROI.

* * * * *